US012043079B2

(12) United States Patent
Leclerc

(10) Patent No.: US 12,043,079 B2
(45) Date of Patent: Jul. 23, 2024

(54) SHOCK ABSORBER FOR A VEHICLE

(71) Applicant: BOMBARDIER RECREATIONAL PRODUCTS INC., Valcourt (CA)

(72) Inventor: Daniel Leclerc, St-Denis-de-Brompton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 441 days.

(21) Appl. No.: 17/309,141

(22) PCT Filed: Oct. 31, 2019

(86) PCT No.: PCT/IB2019/059374
§ 371 (c)(1),
(2) Date: Apr. 29, 2021

(87) PCT Pub. No.: WO2020/089837
PCT Pub. Date: May 7, 2020

(65) Prior Publication Data
US 2022/0009304 A1   Jan. 13, 2022

Related U.S. Application Data

(60) Provisional application No. 62/753,483, filed on Oct. 31, 2018.

(51) Int. Cl.
*B60G 17/08* (2006.01)
*B60G 13/08* (2006.01)
(Continued)

(52) U.S. Cl.
CPC ............ *B60G 17/08* (2013.01); *B60G 13/08* (2013.01); *F16F 9/062* (2013.01); *F16F 9/185* (2013.01);
(Continued)

(58) Field of Classification Search
CPC ........ F16F 2228/066; F16F 9/46; F16F 9/062; F16F 9/185; F16F 9/3235; F16F 9/348;
(Continued)

(56) References Cited

U.S. PATENT DOCUMENTS 5,178,239 A * 1/1993 Homme .................... F16F 9/42
188/274
5,522,484 A   6/1996 Sawai
(Continued)

FOREIGN PATENT DOCUMENTS

CN        1847691 A    10/2006
CN      107091294 A     8/2017
(Continued)

OTHER PUBLICATIONS

International Search Report of PCT/IB2019/059374; Shane Thomas; dated Feb. 6, 2020.
(Continued)

*Primary Examiner* — Robert A. Siconolfi
*Assistant Examiner* — Mahbubur Rashid
(74) *Attorney, Agent, or Firm* — BCF LLP

(57) ABSTRACT

A shock absorber for a vehicle includes an inner tube at least partially defining an inner fluid compartment and an outer tube enclosing at least in part the inner tube therein. Together, the inner tube and the outer tube at least partially define an outer fluid compartment therebetween. The inner tube defines a bypass zone having a plurality of bypass apertures that fluidly communicate the inner fluid compartment with the outer fluid compartment. A piston is movably mounted within the inner tube and moves in compression and in rebound. The piston defines a piston passage extending through the piston for permitting fluid flow between a first side and second side of the piston. An electronically controlled valve is connected to the piston and controls fluid
(Continued)

flow through the piston passage. A method for controlling the shock absorber is also disclosed.

17 Claims, 15 Drawing Sheets

(51) Int. Cl.
| | |
|---|---|
| *F16F 9/06* | (2006.01) |
| *F16F 9/18* | (2006.01) |
| *F16F 9/32* | (2006.01) |
| *F16F 9/348* | (2006.01) |
| *F16F 9/48* | (2006.01) |
| *F16F 9/50* | (2006.01) |

(52) U.S. Cl.
CPC ............ *F16F 9/3235* (2013.01); *F16F 9/348* (2013.01); *F16F 9/48* (2013.01); *F16F 9/50* (2013.01); *B60G 2202/24* (2013.01); *B60G 2204/62* (2013.01); *B60G 2206/41* (2013.01); *B60G 2300/07* (2013.01); *B60G 2400/202* (2013.01); *B60G 2400/252* (2013.01); *B60G 2500/104* (2013.01); *B60G 2500/11* (2013.01); *B60G 2800/162* (2013.01); *B60G 2800/916* (2013.01); *F16F 2222/12* (2013.01); *F16F 2228/066* (2013.01); *F16F 2230/36* (2013.01); *F16F 2232/08* (2013.01); *F16F 2234/02* (2013.01)

(58) Field of Classification Search
CPC .. F16F 9/48; F16F 9/50; F16F 2222/12; F16F 2230/36; F16F 2232/08; F16F 2234/02; B60G 17/08; B60G 13/08; B60G 2202/24; B60G 2204/62; B60G 2206/41; B60G 2300/07; B60G 2400/202; B60G 2400/252; B60G 2500/104; B60G 2500/11; B60G 2800/162; B60G 2800/916
See application file for complete search history.

(56) References Cited

U.S. PATENT DOCUMENTS

| | | | |
|---|---|---|---|
| 5,823,305 A | 10/1998 | Richardson et al. | |
| 6,193,029 B1 | 2/2001 | Crawley et al. | |
| 6,244,398 B1 * | 6/2001 | Girvin ............. | B60G 17/01941 |
| | | | 188/316 |
| 6,273,224 B1 | 8/2001 | Achmad | |
| 6,415,895 B2 * | 7/2002 | Marking ............... | F16F 9/0209 |
| | | | 188/287 |
| 6,672,435 B2 | 1/2004 | Lemieux | |
| 6,851,528 B2 | 2/2005 | Lemieux | |
| 6,883,650 B2 * | 4/2005 | van Wonderen ........ | F16F 9/462 |
| | | | 188/287 |
| 7,374,028 B2 * | 5/2008 | Fox ......................... | F16F 9/512 |
| | | | 188/322.15 |
| 8,807,299 B2 | 8/2014 | Gagnon et al. | |
| 9,168,808 B2 * | 10/2015 | Lindeman .............. | B60G 17/08 |
| 9,694,641 B2 * | 7/2017 | Park ........................ | B60G 13/14 |
| 9,879,749 B2 * | 1/2018 | McNab ................... | F16F 9/348 |
| 9,884,533 B2 * | 2/2018 | Blankenship ........... | F16F 9/463 |
| 2002/0121415 A1 | 9/2002 | Hartel | |
| 2003/0132073 A1 | 7/2003 | Nakadate | |
| 2004/0094376 A1 * | 5/2004 | van Wonderen ........ | F16F 9/467 |
| | | | 188/287 |
| 2006/0289258 A1 * | 12/2006 | Fox ......................... | F16F 9/512 |
| | | | 188/316 |
| 2010/0170760 A1 * | 7/2010 | Marking ................. | F16F 9/466 |
| | | | 280/5.515 |
| 2013/0292218 A1 | 11/2013 | Ericksen et al. | |
| 2014/0116825 A1 | 5/2014 | Lindeman | |
| 2014/0239602 A1 | 8/2014 | Blankenship et al. | |
| 2016/0075204 A1 | 3/2016 | Marking et al. | |
| 2016/0347137 A1 | 12/2016 | Despres-Nadeau et al. | |
| 2020/0049219 A1 * | 2/2020 | Marking ................. | F16F 9/065 |

FOREIGN PATENT DOCUMENTS

| | | | |
|---|---|---|---|
| EP | 1030982 | B1 | 4/2003 |
| ES | 2379847 | B1 | 3/2013 |
| JP | 2006029386 | A | 2/2006 |
| RU | 117898 | U1 | 7/2012 |
| RU | 117998 | U1 | 7/2012 |
| RU | 148173 | U1 | 11/2014 |

OTHER PUBLICATIONS

English translation of ES2379847B1 retrieved from https://patents.google.com/patent/ES2379847B1/en?bq=ES2379847 on Apr. 29, 2021.

English translation of JP2006029386A retrieved from https://patents.google.com/patent/JP2006029386A/en?pq=JP2006029386 on Apr. 29, 2021.

Office Action issued from the ROSPATENT dated Apr. 27, 2023 in connection with the corresponding application No. 2021115417 and including Search Report.

Office Action issued by the Chinese Patent Office on Mar. 21, 2024 in connection with the corresponding application No. 201980072177.3 and including Search Report.

Vehicle Maintenance Technician, 12, Li Hong, 2015 Jaguar X351, The Vehicle Dynamic Suspension System Structure Principle.

* cited by examiner

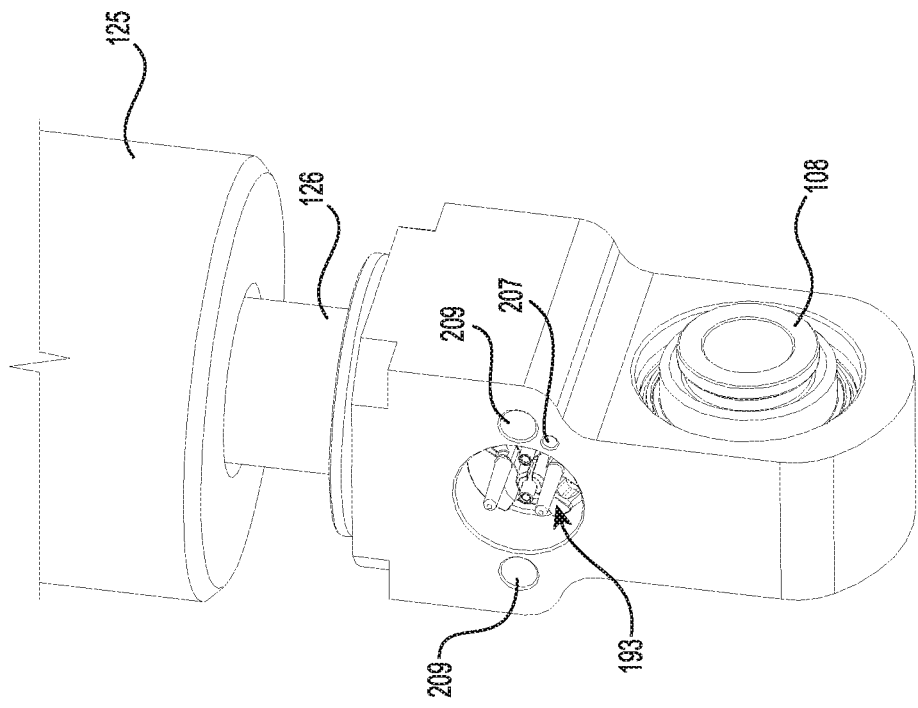
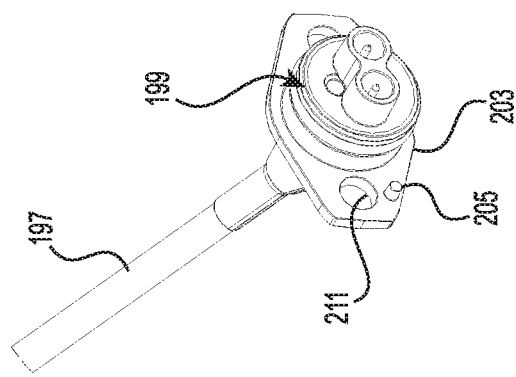
FIG. 11

SHOCK ABSORBER FOR A VEHICLE

CROSS-REFERENCE

The present application claims priority from U.S. Provisional Patent Application No. 62/753,483, filed on Oct. 31, 2018, the entirety of which is incorporated herein by reference.

TECHNOLOGICAL FIELD

The present technology relates to shock absorbers for vehicles.

BACKGROUND

Ground vehicles, such as off-road vehicles for example, are often equipped with a suspension, including a shock absorber, interconnecting a ground-engaging member (e.g., a wheel) to a frame of the vehicle. The shock absorber dampens motion of the frame relative to the ground-engaging member so as to make driving the vehicle more comfortable and safer for the occupant(s) thereof.

Shock absorbers can be provided with different features to calibrate the damping provided thereby. Notably, it is typically desirable to have the range of motion of the shock absorber that is the most frequently engaged during use of the vehicle to be associated with a softer damping calibration (as opposed to a stiffer damping calibration) so as to provide a comfortable ride for a large proportion of the use of the vehicle. However, conventional shock absorbers are typically limited in their range of damping calibration and, moreover, calibration thereof either softens or stiffens the damping along most, if not an entirety, of the range of motion of the shock absorber to a same amount. In addition, in many cases, changing the desired calibration of a conventional shock absorber is inconvenient and time-consuming as it may require disassembly of the shock absorber.

Thus, there is a desire for a shock absorber for a vehicle that addresses some of the aforementioned drawbacks.

SUMMARY

It is an object of the present technology to ameliorate at least some of the inconveniences present in the prior art.

According to an aspect of the present technology, there is provided a shock absorber for a vehicle. The shock absorber includes an inner tube and an outer tube. The inner tube has a first end and a second end. The inner tube at least partially defines an inner fluid compartment. The outer tube encloses at least in part the inner tube therein. The inner tube and the outer tube together at least partially define an outer fluid compartment therebetween. The inner tube defines a bypass zone including a plurality of bypass apertures defined in the inner tube. The plurality of bypass apertures fluidly communicates the inner fluid compartment with the outer fluid compartment. The shock absorber also includes a piston, a piston rod and an electronically controlled valve. The piston is movably mounted within the inner tube. The piston moves in compression when the piston moves towards the first end of the inner tube and in rebound when the piston moves towards the second end of the inner tube. The piston has a first side facing the first end of the inner tube and a second side facing the second end of the inner tube. The piston defines a piston passage extending through the piston for permitting fluid flow between the first side and the second side. The piston rod is connected to the piston and extends through the second end of the inner tube. The electronically controlled valve is connected to the piston and controls fluid flow through the piston passage.

In some implementations of the present technology, the electronically controlled valve comprises a movable member that is movable between a plurality of positions, including: a fully closed position in which the movable member inhibits fluid flow through the piston passage; and a fully open position in which the movable member permits maximal fluid flow through the piston passage.

In some implementations of the present technology, the vehicle comprises a suspension position sensor adapted for sensing a suspension position parameter indicative of a position of the piston. The electronically controlled valve controls a position of the movable member based at least in part on the position of the piston indicated by the suspension position parameter sensed by the suspension position sensor.

In some implementations of the present technology, the electronically controlled valve controls the position of the movable member based at least in part on the position of the piston relative to the bypass zone.

In some implementations of the present technology, the electronically controlled valve moves the movable member to a first position when the piston is between the first end and the bypass zone. The electronically controlled valve moves the movable member to a second position different from the first position when the piston is aligned with the bypass zone. The electronically controlled valve moves the movable member to a third position different from the first and second positions when the piston is between the second end and the bypass zone.

In some implementations of the present technology, the electronically controlled valve moves the movable member to a first position when the piston is between the first end and the bypass zone. The electronically controlled valve moves the movable member to a second position different from the first position when either (i) the piston is aligned with the bypass zone, or (ii) the piston is between the second end and the bypass zone.

In some implementations of the present technology, the electronically controlled valve controls fluid flow through the piston passage based at least in part on a travel speed of the piston.

In some implementations of the present technology, when the piston is moving in rebound near the second end and the travel speed of the piston is below a first predetermined speed, the movable member is closer to the fully open position than the fully closed position.

In some implementations of the present technology, when the piston is moving in compression and is aligned with the bypass zone and the travel speed of the piston is above a second predetermined speed, the movable member is in the fully closed position or is closer to the fully closed position than the fully open position. The second predetermined speed is greater than the first predetermined speed.

In some implementations of the present technology, when the piston is moving in compression between the first end and the bypass zone and the travel speed of the piston is above the second predetermined speed, the movable member is in the fully closed position.

In some implementations of the present technology, the piston passage is a central piston passage. The piston further defines two offset piston passages radially spaced from the central piston passage. The shock absorber also includes a plurality of shims affixed to the piston for restricting fluid flow through the two offset piston passages. The plurality of shims includes: at least one compression shim on the first side of the piston for restricting flow through a first offset piston passage of the two offset piston passages when the piston moves in compression; and at least one rebound shim on the second side of the piston for restricting flow through a second offset piston passage of the two offset piston passages when the piston moves in rebound.

In some implementations of the present technology, the shock absorber also includes: a piggy-back fluid chamber fluidly connected to the inner fluid compartment, the piggy-back fluid chamber having a first end and a second end; a divider movably mounted within the piggy-back fluid chamber, the divider having a first side facing the first end of the piggy-back fluid chamber and a second side facing the second end of the piggy-back fluid chamber, the divider being biased toward the first end of the piggy-back fluid chamber; a channel extending from the piggy-back fluid chamber to the inner tube to fluidly connect the piggy back fluid chamber with the inner fluid compartment, the channel opening into the piggy-back fluid chamber between the divider and the first end of the piggy-back fluid chamber, the channel opening into the inner fluid compartment near the first end of the inner tube.

In some implementations of the present technology, a center-to-center distance between adjacent ones of the bypass apertures measured in a direction parallel to the piston rod is greater than a thickness of the piston measured from the first side to the second side of the piston.

In some implementations of the present technology, the inner tube defines a refill zone including a plurality of refill apertures defined in the inner tube. The plurality refill apertures fluidly communicates the inner fluid compartment with the outer fluid compartment. The refill zone is closer to the second end of the inner tube than the bypass zone.

In some implementations of the present technology, a vehicle includes the shock absorber.

In some implementations of the present technology, the vehicle includes a frame and at least one wheel. The shock absorber is connected between the frame and the at least one wheel.

In some implementations of the present technology, a vehicle includes: a frame; a rear wheel; and a rear suspension assembly interconnecting the rear wheel to the frame. The rear suspension assembly includes: a swing arm pivotally connected to the frame; and the shock absorber. The suspension position sensor is connected between the swing arm and the frame such as to sense a rear suspension position parameter representative of a position of the swing arm relative to the frame.

In some implementations of the present technology, a vehicle includes: a frame; a front wheel; and a front suspension assembly interconnecting the front wheel to the frame. The front suspension assembly includes: an A-arm connected to the frame; and the shock absorber. The suspension position sensor is connected between the A-arm and the frame such as to sense a front suspension position parameter representative of a position of the A-arm relative to the frame.

According to another aspect of the present technology, there is provided a method for controlling a shock absorber. The shock absorber includes: an inner tube and an outer tube. The inner tube has a first end and a second end. The inner tube defines an inner fluid compartment. The outer tube encloses at least in part the inner tube therein. The inner tube and the outer tube together partially define an outer fluid compartment therebetween. The inner tube defines a bypass zone including a plurality of bypass apertures defined in the inner tube. The plurality of bypass apertures fluidly communicates the inner fluid compartment with the outer fluid compartment. The method includes: determining a position of a piston of the shock absorber relative to the bypass zone; and controlling an electronically controlled valve to selectively restrict a piston passage extending through the piston based at least in part on a position of the piston relative to the bypass zone.

In some implementations of the present technology, controlling the electronically controlled valve to selectively restrict the piston passage includes: moving a movable member of the electronically controlled valve to a first position when the piston is between the first end and the bypass zone; moving the movable member of the electronically controlled valve to a second position when the piston is aligned with the bypass zone; moving the movable member to a third position when the piston is between the second end and the bypass zone.

In some implementations of the present technology, the method also includes: determining a travel speed of the piston; and controlling the electronically controlled valve to selectively restrict the piston passage includes controlling the electronically controlled valve to selectively restrict the piston passage based at least in part on the travel speed of the piston.

In some implementations of the present technology, the movable member is movable between a plurality of positions including: a fully closed position in which the movable member inhibits fluid flow through the piston passage; and a fully open position in which the movable member permits maximal fluid flow through the piston passage. Controlling the electronically controlled valve to selectively restrict the piston passage based at least in part on the travel speed of the piston includes: moving the movable member such that the movable member is closer to the fully open position than the fully closed position when the piston is moving in rebound near the second end and the travel speed of the piston is below a first predetermined speed.

In some implementations of the present technology, controlling the electronically controlled valve to selectively restrict the piston passage based at least in part on the travel speed of the piston includes: moving the movable member such that the movable member is in the fully closed position or is closer to the fully closed position than the fully open position when the piston is moving in compression and is aligned with the bypass zone and the travel speed of the piston is above a second predetermined speed greater than the first predetermined speed.

In some implementations of the present technology, controlling the electronically controlled valve to selectively restrict the piston passage based at least in part on the travel speed of the piston includes: moving the movable member such that the movable member is in the fully closed position when the piston is moving in compression between the first end and the bypass zone and the travel speed of the piston is above the second predetermined speed.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 11 is a perspective view of part of the shock absorber of FIG. 3, showing a control connector thereof;

DETAILED DESCRIPTION

Figure 1:
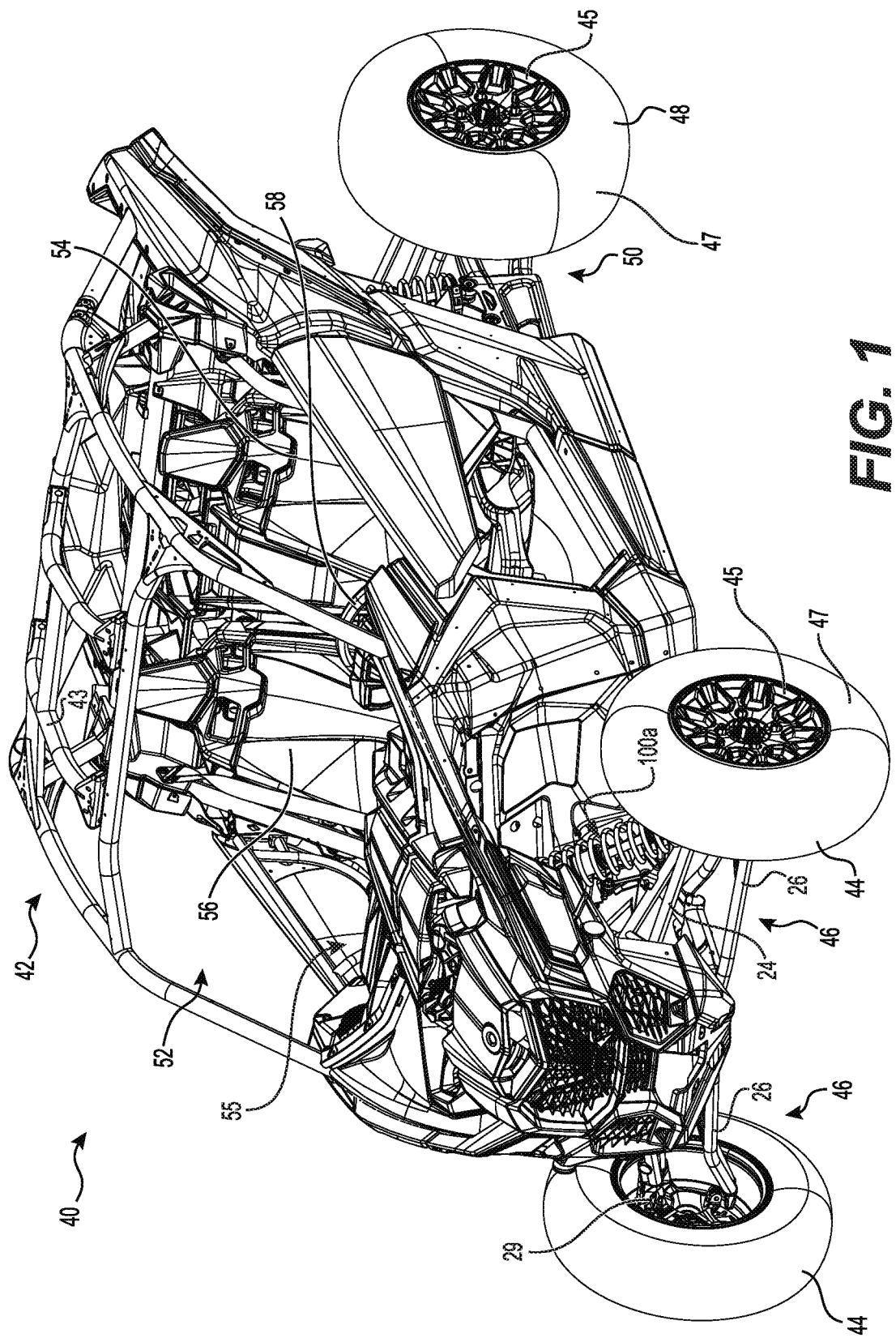
FIG. 1 is a top, front, left side perspective view of a side-by-side vehicle.

The present technology will be described with respect to four-wheel, off-road vehicles having two side-by-side seats and a steering wheel (i.e. a side-by-side vehicle (SSV)). However, it is contemplated that at least some aspects of the present technology may apply to other types of vehicles such as, but not limited to, off-road vehicles having a straddle seat and a handle bar (i.e. an all-terrain vehicle (ATV)), off-road vehicles having a single bucket-type seat, off-road vehicles with more than four wheels, and on-road vehicles having four or more wheels and having one or more seats, as well as other vehicles that use shock absorbers, such as snowmobiles for example.

The general features of an off-road vehicle 40, specifically a side-by-side vehicle (SSV) 40, will be described with respect to FIGS. 1 and 2. The vehicle 40 has a frame 42. The frame 42 defines a central cockpit area 52 inside which are disposed a driver seat 54 and a passenger seat 56. In the present implementation, the driver seat 54 is disposed on the left side of the vehicle 40 and the passenger seat 56 is disposed on the right side of the vehicle 40. However, it is contemplated that the driver seat 54 could be disposed on the right side of the vehicle 40 and that the passenger seat 56 could be disposed on the left side of the vehicle 40. It is also contemplated that the vehicle 40 could include a single seat for the driver, or a larger number of seats, or a bench accommodating the driver and at least one passenger. The vehicle 40 also includes a roll cage 43 connected to the frame 42 and extending at least partially over the seats 54, 56.

The vehicle 40 includes left and right front wheels 44 connected to the frame 42 by a pair of front suspension assemblies 46. Left and right rear wheels 48 are connected to the frame 42 by a pair of rear suspension assemblies 50. The front and rear suspension assemblies 46, 50 will be described in greater detail below. Each one of the front and rear wheels 44, 48 has a rim 45 and a tire 47. The rims 45 and tires 47 of the front wheels 44 may differ in size from the rims and tires of the rear wheels 48.

The vehicle 40 includes a steering wheel 58 operatively connected to the front wheels 44 for controlling an angle of the front wheels 44. The driver operates the steering wheel 58 from the driver seat 54. The steering wheel 58 is disposed in front of the driver seat 54. A steering position sensor (not shown) is operatively connected to the steering wheel 58, via a steering assembly, for determining a steering angle of the front wheels 44. The vehicle 40 also includes a dashboard 55 disposed forward of the seats 54, 56. A throttle operator in the form of a throttle pedal 91 is disposed over the floor of the cockpit area 52 below the steering wheel 58 and in front of the driver seat 54. A pedal position sensor (not shown) is operatively connected to the throttle pedal 91 to sense movement of the pedal 91 caused by the driver in operation.

Figure 2:
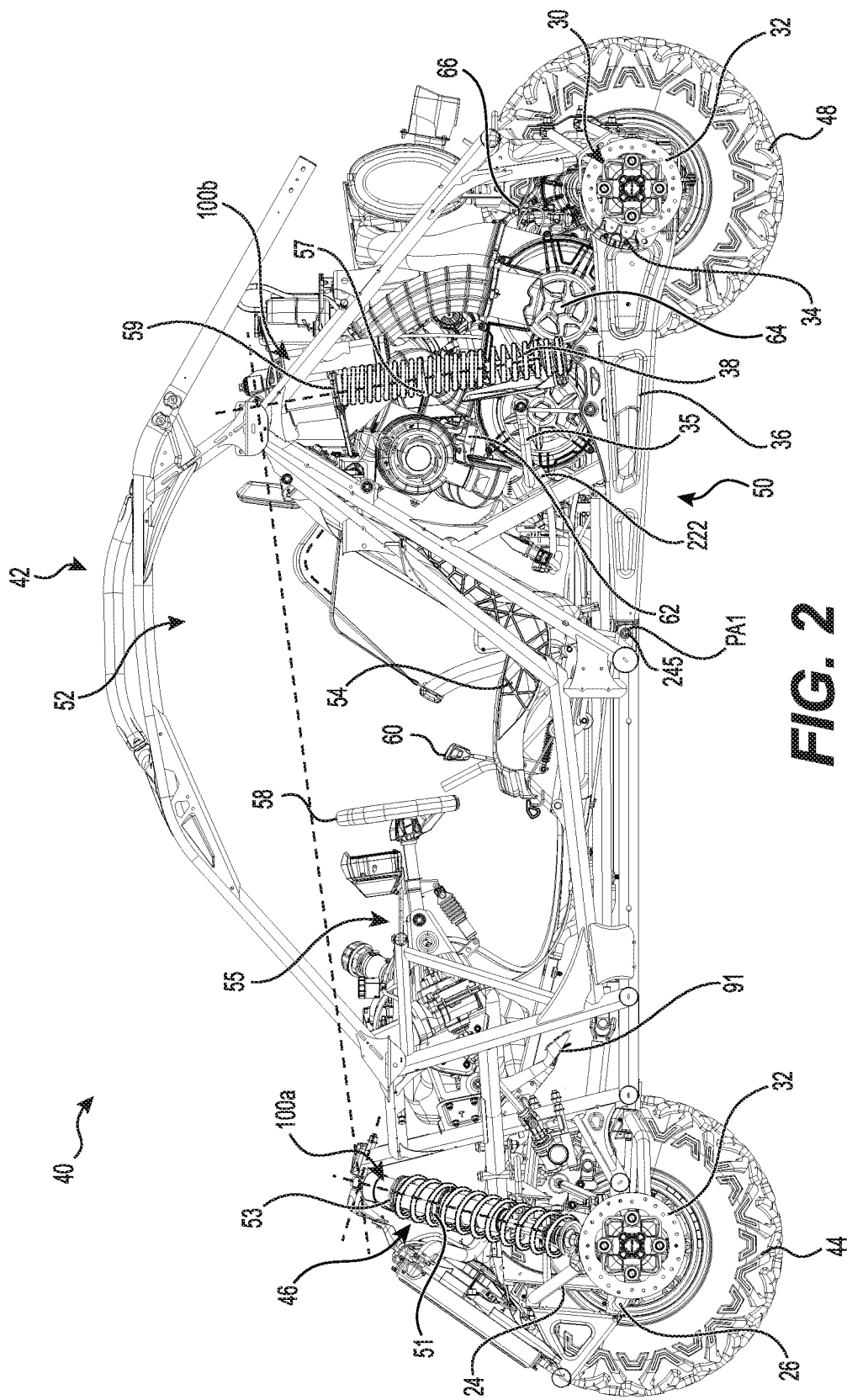
FIG. 2 is a left side elevation view of portions of the vehicle of FIG. 1.

As can be seen in FIG. 2, a motor 62 is connected to the frame 42 in a rear portion of the vehicle 40. In the present implementation, the motor 62 is an internal combustion engine but the present technology is not so limited. It is contemplated that the engine 62 could be replaced by a hybrid or electric motor in some implementations. The vehicle 40 includes an engine control module (ECM) for monitoring and controlling various operations of the engine 62. The ECM is communicatively connected to the pedal position sensor for receiving signals for controlling a throttle valve (not shown) of the engine 62. The engine 62 further includes a throttle position sensor (not shown) operatively connected to the throttle valve and communicatively connected to the ECM for monitoring the position of the throttle valve.

The vehicle 40 includes four brake assemblies 30, one of which is shown in FIG. 2. One brake assembly 30 is operatively connected to each of the wheels 44, 48. Each brake assembly 30 includes a brake disc 32 and a caliper 34 disposed around its corresponding brake disc 32. Each caliper 34 is connected to a corresponding brake line (not shown). The brake lines are connected to an anti-lock braking system (ABS) module. Each caliper 34 includes a pair of brake pads positioned on opposite sides of its respective brake disc 32. The brake assemblies 30 are actuated by actuating the calipers 34 by application of a fluid pressure in the brake lines, thereby causing the brake pads to apply pressure on their respective brake discs 32.

The motor 62 is connected to a transmission 64, specifically a continuously variable transmission (CVT) 64 disposed on a left side of the motor 62. The CVT 64 is operatively connected to a transaxle 66 to transmit torque from the motor 62 to the transaxle 66. The transaxle 66 is operatively connected to the front and rear wheels 44, 48 to propel the vehicle 40. The motor 62 and the transmission 64 are supported by the frame 42. Variants of the vehicle 40 having other transmission types are contemplated.

The transaxle 66 is mechanically connected to a shifter 60 disposed laterally between the two seats 54, 56. The shifter 60 allows the driver to select from a plurality of combinations of engagement of gears of the transaxle 66, commonly referred to as gears. In the present implementation, the shifter 60 allows the driver to select between a reverse gear, two forward gears (high and low) and a neutral position in which the transaxle 66 does not transmit torque to the wheels 44, 48. It is contemplated that other types of connections between the shifter 60 and the transaxle 66 could be used.

The transaxle 66 transmits the torque applied thereon to drive the left and right rear wheels 48. While the vehicle 40 is described with the rear wheels 48 driving the vehicle 40 when in 2×4 drive mode, it is contemplated that the front wheels 44 could be driven when the vehicle 40 is in 2×4 drive mode in some implementations. Specifically, the transaxle 66 includes left and right half-shafts and a differential connected therebetween for applying torque to the rear driven wheels 48. The differential is operatively connected between the transmission 64 and the left and right driven wheels 48. Furthermore, in a 4×4 drive mode, the front wheels 44 and the rear wheels 48 are driven.

Figure 12:
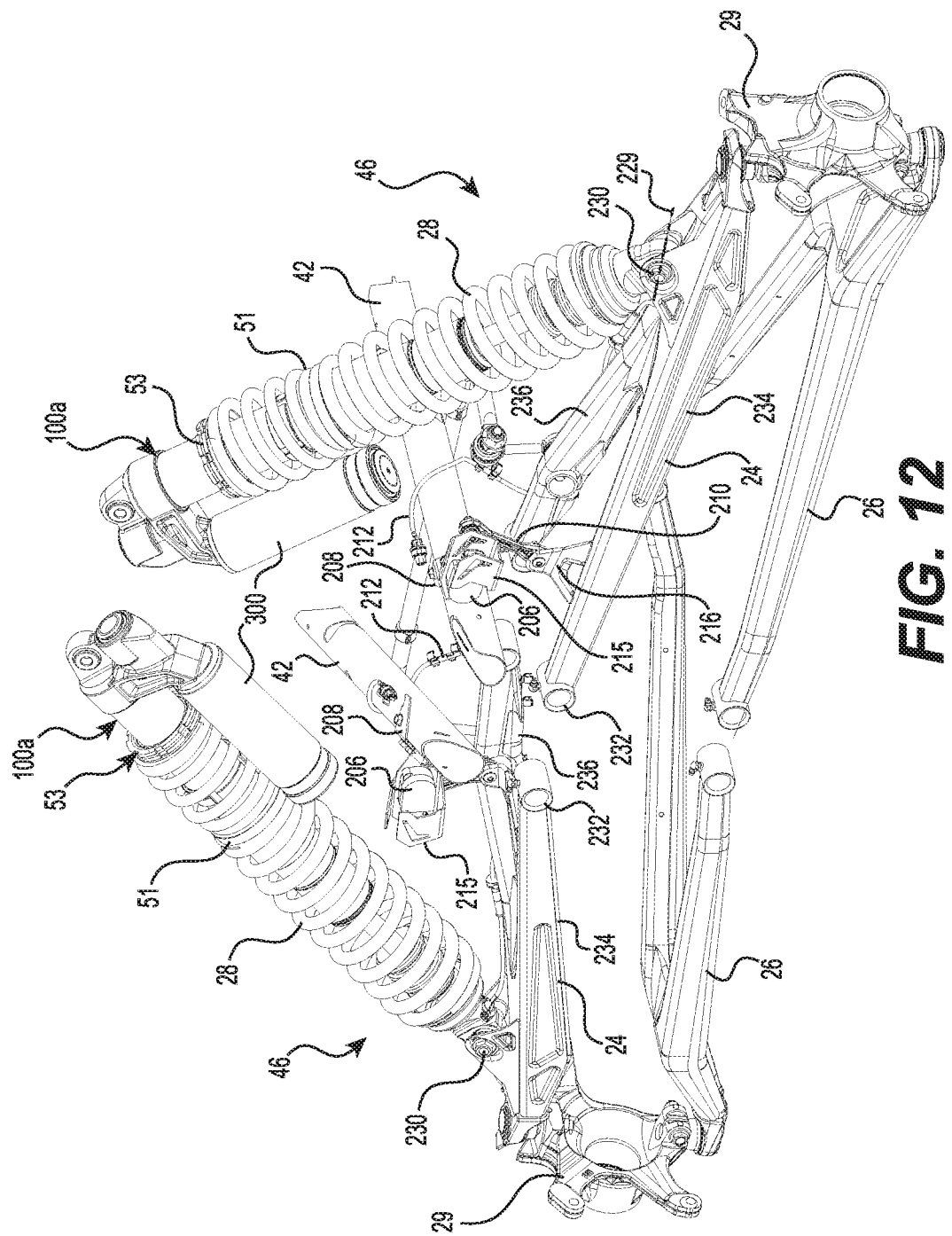
FIG. 12 is a top, front, left side perspective view of front suspension assemblies of the vehicle of FIG. 1.

As shown in FIGS. 1, 2 and 12 each front suspension assembly 46 includes an upper A-arm 24, a lower A-arm 26, a front shock absorber 100a and a front coil spring 28. The front coil spring 28 is mounted over the front shock absorber 100a and connected thereto via a fixed spring seat 51 and an adjustable spring seat 53. The front coil spring 28 and the front shock absorber 100a are both pivotably connected at their lower ends to the upper A-arm 24 and at their upper ends to the frame 42. The upper and lower A-arms 24, 26 each have one end pivotably connected to the frame 42. A kingpin 29 (FIG. 12) is mounted to each opposed ends of the upper and lower A-arms 24, 26. Each front wheel 44 is supported in part by its corresponding kingpin 29.

Figure 13:
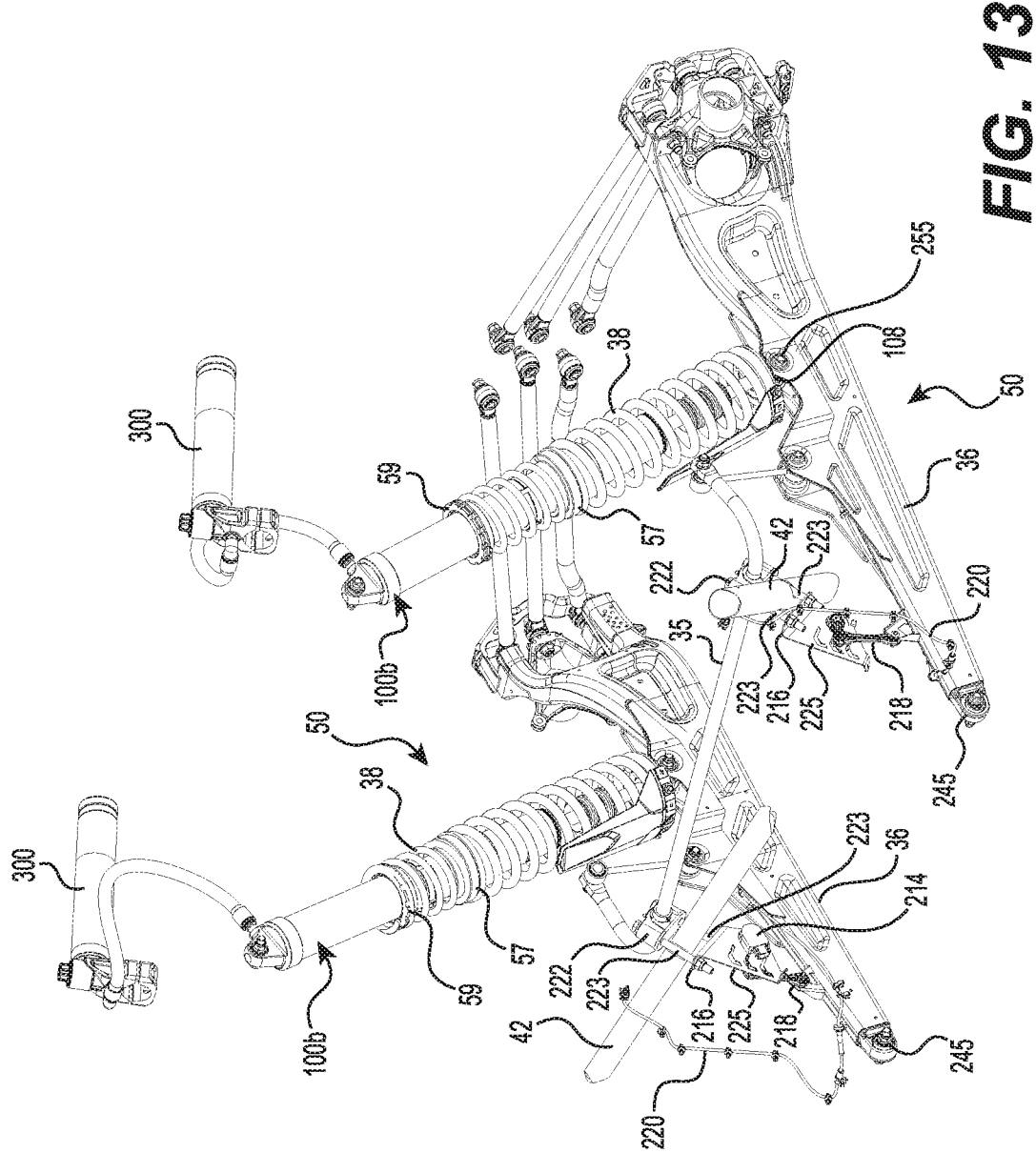
FIG. 13 is a top, front, left side perspective view of rear suspension assemblies of the vehicle of FIG. 1.

As shown in FIGS. 2 and 13, each rear suspension assembly 50 comprises a swing arm 36, a rear shock absorber 100b and a rear coil spring 38. The rear coil spring 38 is mounted over the rear shock absorber 100b and connected thereto via a fixed spring seat 57 and an adjustable spring seat 59. Each swing arm 36 has one end pivotably connected to the frame 42, about a pivot axis located in front of the rear wheels 48 and extending generally laterally within the frame 42, and an opposite end supporting a wheel shaft of its corresponding rear wheel 48. Each swing arm 36 is connected at mid-length to a torsion bar 35 by links The torsion bar 35 is mounted to the frame 42 via pillow blocks 222. For each rear suspension assembly 50, the rear shock absorber 100b and the rear coil spring 38 each have one end pivotally connected to the frame 42 and the other end pivotally connected to its corresponding swing arm 36 near a rear end thereof.

The shock absorbers 100a, 100b absorb and dampen shock impulses experienced while driving the vehicle 40 and dampen the oscillations of the corresponding coil springs 28, 38. The shock absorbers 100a, 100b provide compression damping whereby the shock absorbers 100a, 100b are compressed to absorb bumps or road irregularity as the wheels 44, 48 move upwards. The shock absorbers 100a, 100b also provide rebound damping whereby the shock absorbers 100a, 100b return to their normal position after a bump or other irregularity having caused compression, or when encountering a depression.

The shock absorbers 100a, 100b of the front and rear suspension assemblies 46, 50 will now be described in more detail with reference to FIGS. 3 to 9. Since the shock absorbers 100a, 100b of the front and rear suspension assemblies 46, 50 are similar, only the shock absorber 100a of one of the front suspension assemblies 46 will be described herein. It is understood that, unless otherwise stated, the same description applies to the shock absorber 100a of the other front suspension assembly 46 and the shock absorbers 100b of the rear suspension assemblies 50.

Figure 3:
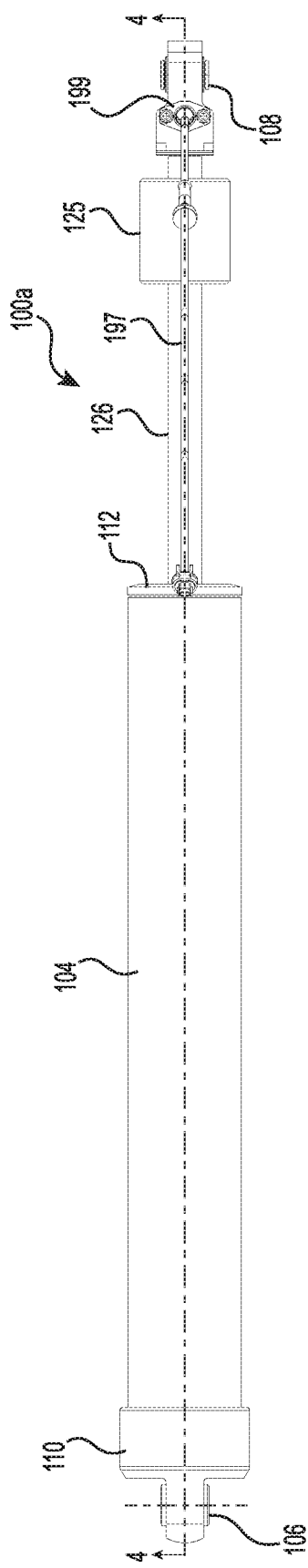
FIG. 3 is a plan view of a shock absorber of a suspension assembly of the vehicle of FIG. 1.

As mentioned above, the shock absorber 100a is operatively connected between the frame 42 and the corresponding wheel 44. To that end, as shown in FIG. 3, the shock absorber 100a has opposite connecting mounts 106, 108 for respectively connecting to the frame 42 and the upper A-arm 24 of the front suspension assembly 46. The connecting mounts 106, 108 may thus be referred to as a "frame mount" 106 and a "suspension mount" 108 respectively. It is contemplated that the shock absorber 100a could be connected to any other suitable support member of the front suspension assembly 46. In the case of the rear suspension assemblies 50, each shock absorber 100b thereof is connected between the frame 42 and a corresponding swing arm 36.

Figure 4:
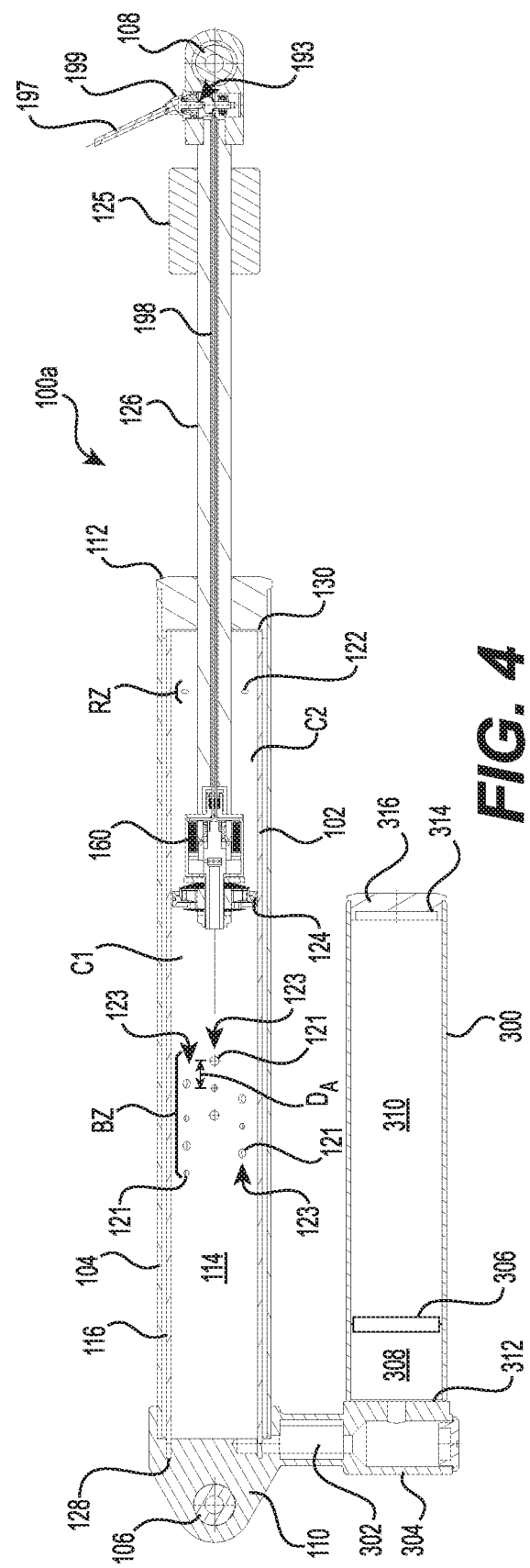
FIG. 4 is a cross-sectional view of the shock absorber of FIG. 3 taken along line 4-4 in FIG. 3.

The shock absorber 100a is a twin-tube type shock absorber and thus, as shown in FIG. 4, includes an inner tube 102 and an outer tube 104 partially enclosing the inner tube 102 therein. End caps 110, 112 are affixed to either end of the outer tube 104 (e.g., by a threaded engagement) to enclose the volumes partially defined by each of the inner and outer tubes 102, 104. More specifically, the inner tube 102, together with the end caps 110, 112, defines an inner fluid compartment 114. An outer fluid compartment 116, disposed radially outwardly of the inner fluid compartment 114, is defined between the inner tube 102 and the outer tube 104 and by the end caps 110, 112.

As best seen in FIG. 4, the inner tube 102 defines a bypass zone BZ including a plurality of bypass apertures 121 defined in the inner tube 102. The bypass apertures 121 fluidly communicate the inner fluid compartment 114 with the outer fluid compartment 116. The bypass apertures 121 are arranged to form rows 123 of circumferentially-aligned apertures 121 (i.e., apertures aligned along the circumference of the inner tube 102). The bypass zone BZ is located closer to the end 128 of the inner tube 102 than the opposite end 130 of the inner tube 102.

The inner tube 102 also defines a refill zone RZ including a plurality of refill apertures 122 defined in the inner tube 102. The refill apertures 122 fluidly communicate the inner fluid compartment 114 with the outer fluid compartment 116. As such, fluid can flow from the inner fluid compartment 114 through the bypass apertures 121 into the outer fluid compartment 116, and through the refill apertures 122 into the inner fluid compartment 114 and vice-versa. In this embodiment, the refill apertures 122 are axially aligned with one another (i.e., aligned in the axial direction of the inner tube 102).

As will be explained below, the bypass zone BZ and the refill zone RZ are provided to soften the damping calibration of the shock absorber 100a within a certain range of travel of a piston 124 thereof.

Figure 7:
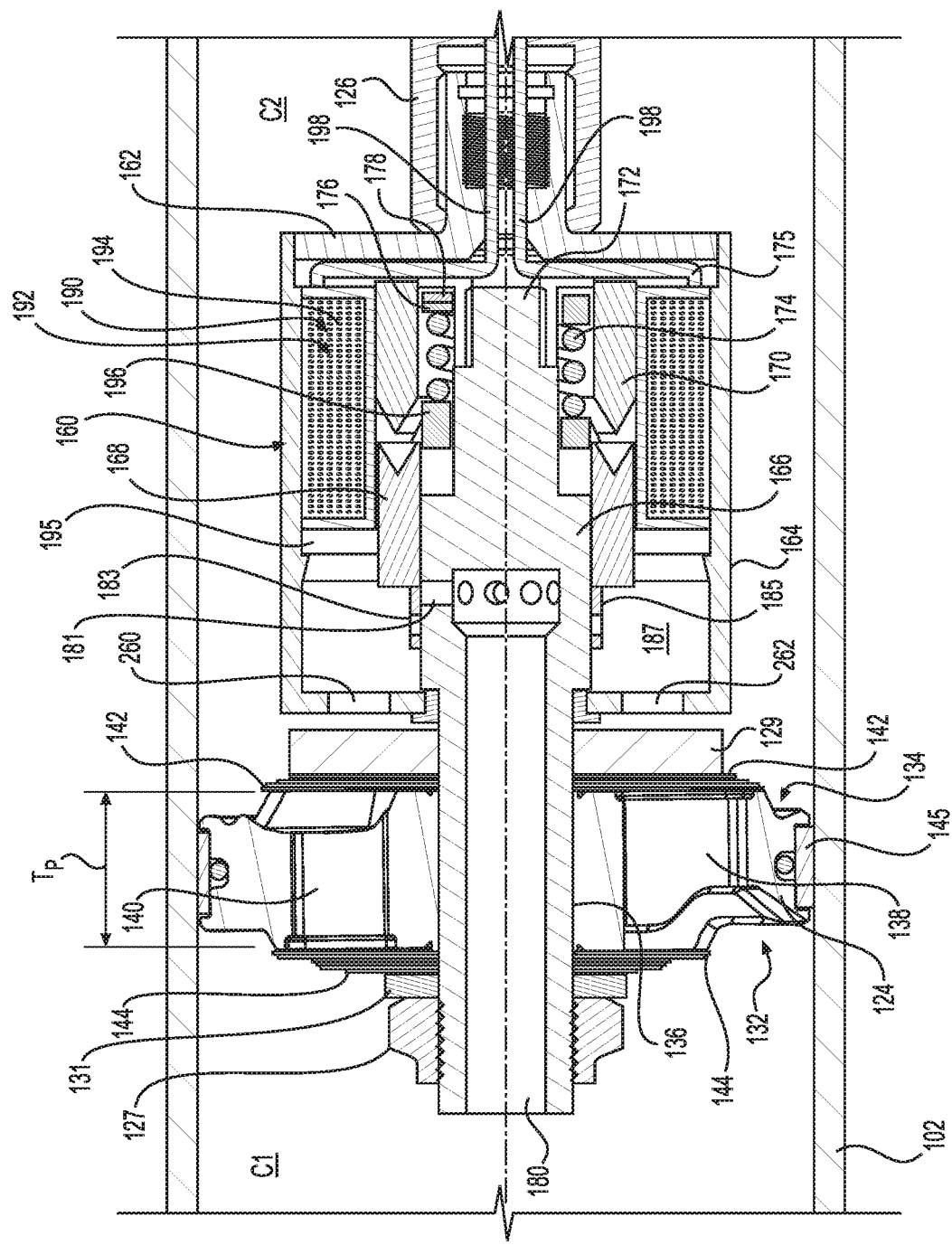
FIG. 7 is a cross-sectional view of part of the shock absorber of FIG. 3, in which a movable member of an electronically controlled valve of the shock absorber is in a fully closed position.
Figure 8:
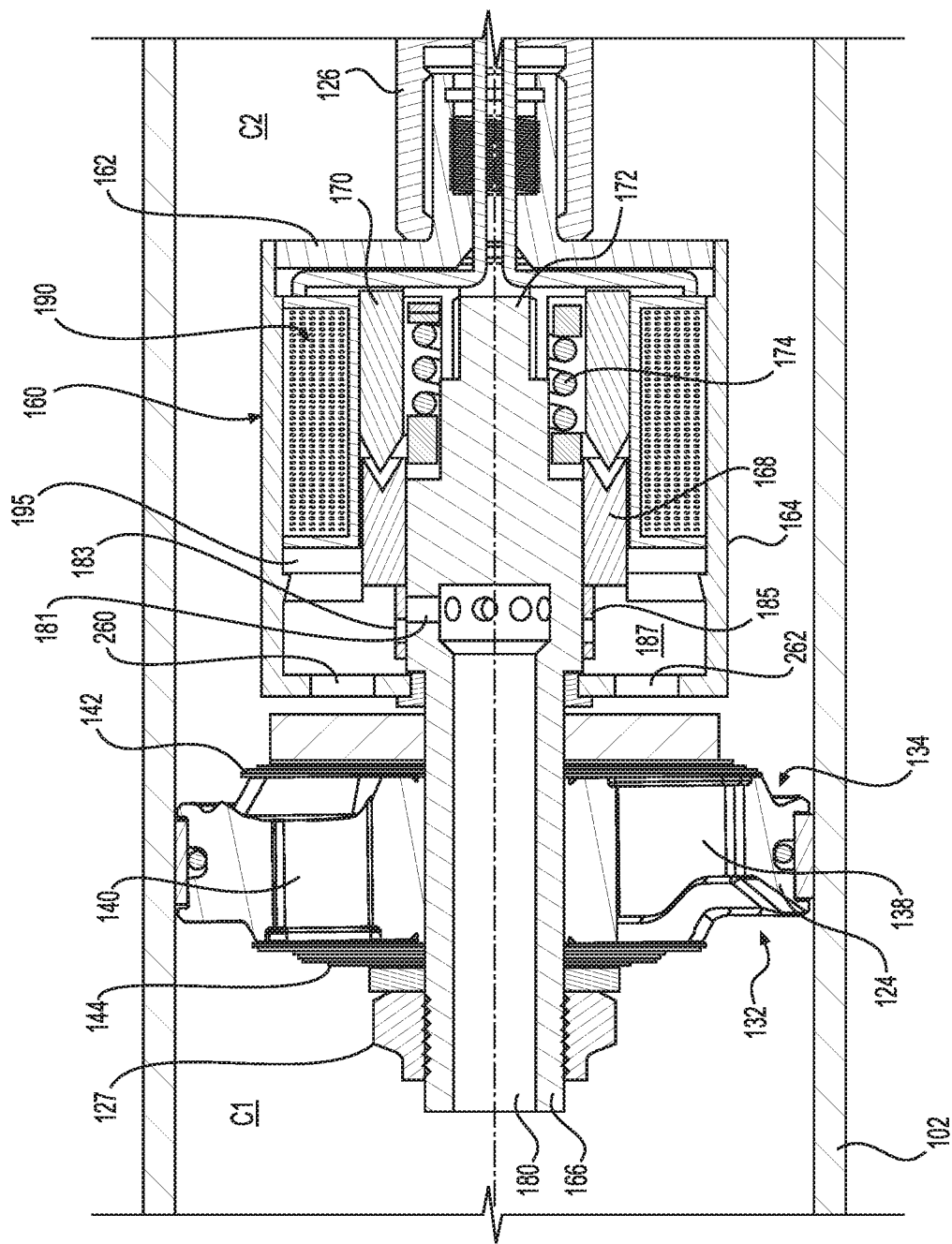
FIG. 8 is a cross-sectional view of part of the shock absorber of FIG. 3, in which the movable member of the electronically controlled valve of the shock absorber is in a partially open position.

As shown in FIG. 4, the piston 124 is movably mounted within the inner tube 102 such that the piston 124 divides the inner fluid compartment 114 into two variable volume chambers C1, C2 on opposite sides of the piston 124. Notably, the chamber C1 is defined between a side 132 of the piston 124 (facing the end 128 of the inner tube 102) and the end cap 110, while the chamber C2 is defined between an opposite side 134 of the piston 124 (facing the end 130 of the inner tube 102) and the end cap 112. The outer periphery of the piston 124 is sealed by a piston ring 145 (FIG. 7) fitted thereto to prevent fluid leaking from the chamber C1 to the chamber C2 between the outer periphery of the piston 124 and the inner wall of the inner tube 102. As shown in FIG. 7, the piston 124 has a thickness $T_P$ measured from the side 132 to the opposite side 134 of the piston 124. A center-to-center distance $D_A$ (FIG. 4) between adjacent ones of the bypass apertures 121 measured in a direction parallel to a piston rod 126 (which will be described further below) is greater than the thickness $T_P$ of the piston 124. As such, in certain positions of the piston 124, the piston 124 can be straddled on either side thereof by some of the bypass apertures 121.

The piston 124 is said to move in compression when the piston 124 moves towards the end 128 of the inner tube 102 (such that the chamber C1 gets smaller) and in rebound when the piston 124 moves in the opposite direction towards the end 130 of the inner tube 102 (such that the chamber C2 gets smaller).

A hollow piston rod 126 connects the piston 124 to the suspension mount 108 and moves together with the piston 124. The piston rod 126 extends through the end 130 of the inner tube 102 to connect to the suspension mount 108. A limiter 125 (also commonly referred to as a "bump stop") is connected to the piston rod 126 adjacent the suspension mount 108 so as to limit the compression stroke of the shock absorber 100a and thereby prevent contact between the suspension mount 108 and the end cap 112.

The bypass apertures 121 of the bypass zone BZ and the refill apertures 122 of the refill zone RZ allow the piston 124 to move more freely (i.e., with a softer damping calibration) in a middle range of travel of the piston 124 (i.e., a range of travel of the piston 124 that is frequently engaged during use of the vehicle 40—e.g., 50% or more of the time) defined between the bypass and refill zones BZ, RZ. This softens the damping calibration of the shock absorber 100a to provide a comfortable ride for the occupants of the vehicle 40 in the most active range of travel of the piston 124. Notably, due to the position of the bypass apertures 121, when the piston 124 is between the bypass zone BZ and the refill zone RZ and the piston 124 moves in compression toward the bypass apertures 121, fluid in the chamber C1 of the inner fluid compartment 114 bypasses the piston 124 by flowing through the bypass apertures 121 and into the outer fluid compartment 116 (thus exerting less resistance to motion of the piston 124) and then through the refill apertures 122 into the chamber C2 of the inner fluid compartment 114. Similarly, when the piston 124 is between the bypass zone BZ and the refill zone RZ and the piston 124 moves in rebound toward the refill apertures 122, fluid in the chamber C2 of the inner fluid compartment 114 bypasses the piston 124 by flowing through the refill apertures 122 and into the outer fluid compartment 116 (thus exerting less resistance to motion of the piston 124) and then through the bypass apertures 121 into the chamber C1 of the inner fluid compartment 114.

As will be described in greater detail below, the piston 124 itself also has features for calibrating the damping of the shock absorber 100a.

The shock absorber 100a has a piggy-back fluid chamber 300 fluidly connected to the inner fluid compartment 114 via a channel 302 defined by a fluid connector 304. A divider 306 is movably mounted within the piggy-back fluid chamber 300 and divides the piggy-back fluid chamber 300 into two separate variable volume sub-chambers 308, 310. The sub-chamber 308 is defined between one side of the divider 306 and an end 312 of the piggy-back fluid chamber 300, while the sub-chamber 310 is defined between the opposite side of the divider 306 and an end 314 of the piggy-back fluid chamber 300. The end 312 is defined by the fluid connector 304 while the end 314 is defined by an end cap 316. The sub-chamber 308 contains the same liquid fluid that is contained in the inner fluid compartment 114 and thus the sub-chamber 308 may be generally referred to as the liquid fluid sub-chamber 308. The sub-chamber 310 contains a compressible gas and thus may be generally referred to as the gas sub-chamber 310. The divider 306 is biased toward an end 312 of the piggy-back fluid chamber 300 by the gas in the gas sub-chamber 310.

The channel 302 extends from the piggy-back fluid chamber 300 to the inner tube 102 to fluidly connect the piggy-back fluid chamber 300 with the inner fluid compartment 114. More specifically, the channel 302 opens into the piggy-back fluid chamber 300 between the divider 306 and the end 312 of the piggy-back fluid chamber 300 (i.e., in the liquid fluid sub-chamber 308). At the inner tube 102, the channel 302 opens into the inner fluid compartment 114 near the end 128 of the inner tube 102 (i.e., into the chamber C1).

Fluid from the inner fluid compartment 114 is pushed into the liquid fluid sub-chamber 308 to compensate for the volume taken up by the piston rod 126 in the chamber C1 when the piston rod 126 is pushed further into the inner fluid compartment 114. Fluid is therefore pushed through the channel 302 into the liquid fluid sub-chamber 308 which expands the volume of the liquid fluid sub-chamber 308 by pushing on the divider 306 to compress the gas in the gas sub-chamber 310 and reduce the volume of the gas sub-chamber 310. Similarly, when the piston rod 126 exits the inner fluid compartment 114, the reduction of the volume taken up by the piston rod 126 in the chamber C1 must be compensated by re-introducing the equivalent volume of hydraulic fluid from the liquid fluid sub-chamber 308 into the inner fluid compartment 114. Including the external piggy-back fluid chamber 300, decreases the overall length of the shock absorber 100a and may help package the shock absorber 100a for positioning in tight areas on a vehicle.

The piston 124 defines various passages that extend through the piston 124 to permit fluid flow therethrough from the chamber C1 to the chamber C2 and vice-versa. Notably, the piston 124 defines a central passage 136 and offset passages 138, 140 that are radially spaced from the central passage 136. Fluid flow through the passages 136, 138, 140 is controlled in order to calibrate the damping of the shock absorber 100a. In particular, as shown in FIG. 7, stacks of compression shims 142 and rebound shims 144 are provided to restrict fluid flow through the offset passages 138, 140 when the piston 124 moves in compression and rebound respectively. The compression and rebound shims 142, 144 are affixed to the piston 124. The rebound shims 144 are clamped against the piston 124 by a nut 127 and a spacer 131. The compression shims 142 are pressed against the piston 124 by a spacer 129.

The compression shims 142 inhibit (i.e., close off) fluid flow through the offset passage 138 when the piston 124 moves in rebound (i.e., there is no fluid flow through the offset passage 138 when the piston 124 is moving toward the end 130 of the inner tube 102). However, when the piston 124 moves in compression, fluid in the offset passage 138 exerts force on the compression shims 142 to elastically deform the compression shims 142 thus allowing fluid flow from the chamber C1 to the chamber C2 via the offset passage 138. Similarly, the rebound shims 144 inhibit flow through the offset passage 140 when the piston 124 moves in compression (i.e., there is no fluid flow through the offset passage 140 when the piston 124 is moving toward the end 128 of the inner tube 102). However, when the piston 124 moves in rebound, fluid in the offset passage 140 exerts force on the rebound shims 144 to elastically deform the rebound shims 144 thus allowing fluid flow from the chamber C2 to the chamber C1 via the offset passage 140.

The compression and rebound shims 142, 144 thus provide a set amount of resistance against movement of the piston 124 within the inner tube 102. By selecting the thickness and number of the compression and rebound shims 142, 144, the force required to elastically deform the shims 142, 144 can be increased or decreased. Thus, the compression and rebound damping of the shock absorber 100a is calibrated by choosing the configuration of the compression and rebound shims 142, 144. However, adjusting the configuration of the shims 142, 144 once the shock absorber 100a is already assembled can be tedious as it necessitates disassembly of the shock absorber 100a. Alternatively or additionally, the dimensions of the offset passages 138, 140 can be changed to calibrate the damping of the shock absorber 100a. However, again, this would require disassembling the shock absorber 100a to replace the piston 124 or modify it in such a way as to adjust the dimensions of the offset passages 138, 140.

The shock absorber 100a also has an electronically controlled valve 160 for controlling fluid flow through the central passage 136. More specifically, the valve 160 is operable to progressively close and open fluid flow through the central passage 136 of the piston 124 such as to calibrate the damping provided by the shock absorber 100a. In this embodiment, the valve 160 connects the piston 124 to the piston rod 126. The valve 160 can be configured in various ways. For example, in this embodiment, the valve 160 is of the type described in U.S. Pat. No. 9,168,808, which is incorporated by reference herein.

More specifically, with reference to FIG. 7, in this embodiment, the valve 160 has a valve base 162 connected to the piston rod 126 and a valve housing 164 connected to an outer periphery of the valve base 162 (e.g., via a threaded engagement). A slider guide 166 is housed in part within the valve housing 164 and is configured to guide a movable member 168 as will be described in greater detail below. The valve base 162 has a cylindrical spring receptacle 170 defining a central hollow space. An end portion 172 of the slider guide 166 is disposed within the hollow space defined by the spring receptacle 170 and a spring 174 surrounds the end portion 172 of the slider guide 166 such that the spring 174 is disposed between the spring receptacle 170 and the end portion 172 of the slider guide 166. At one end, the spring 174 is retained onto the valve base 162 by a spring retainer 176, which is connected to a wave spring 178. At the other end, the spring 174 is retained by a non-magnetic spacer 196 which in turn retains an edge of the movable member 168.

The movable member 168 is generally cylindrical and defines a central opening. An inner peripheral surface of the movable member 168, defined by the central opening thereof, slidably engages an outer peripheral surface of the slider guide 166 such that the movable member 168 is slidable along an axis of the slider guide 166. The movable member 168 defines a plurality of apertures 183 aligned with one another along the length of the movable member 168 and distributed evenly about a circumference of the movable member 168. A lower portion 185 of the movable member 168 adjacent the apertures 183 in a direction of the axis of the movable member 168 does not comprise any apertures and, as will be discussed in more detail below, is used to restrict fluid flow through the valve 160.

The piston 124 is mounted on the slider guide 166 via the central passage 136 such that the slider guide 166 extends through the piston 124 (i.e., from the side 132 to the other side 134 of the piston 124). The slider guide 166 has a main passage 180 extending in a direction of an axis of the inner tube 102, and multiple side passages 181 in fluid communication with the main passage 180 and bored radially at an end portion of the main passage 180.

The movable member 168 is controlled by the valve 160 to selectively restrict fluid flow through the central passage 136. More specifically, the movable member 168 of the valve 160 is movable between a plurality of positions, including a fully open position (illustrated in FIG. 9) and a fully closed position (illustrated in FIG. 7), in order to selectively restrict fluid flow through the central passage 136 of the piston 124 by blocking partially or entirely fluid communication between the side passages 181 and the apertures 183. In the fully open position, the apertures 183 of the movable member 168 are aligned with the side passages 181 of the slider guide 166 such that the movable member 168 permits maximal fluid flow through the central passage 136. In the fully closed position, the apertures 183 of the movable member 168 are not aligned with the side passages 181 and instead the lower portion 185 is aligned with the side passages 181 such as to inhibit fluid flow between the side passages 181 and an inner chamber 187 formed within the valve housing 164 (i.e., fluid flow through the central passage 136 is not permitted by the movable member 168).

When the movable member 168 is in the fully open position or a partially open position and that the piston 124 is moving in compression, a portion of fluid flowing from the chamber C1 to the chamber C2 flows from the chamber C1, through the main passage 180, through the side passages 181, through the apertures 183, into the inner chamber 187, and through passages 260, 262 defined by the valve housing 164 to the chamber C2. It is understood that, under some circumstances, when the piston 124 is moving in compression, portions of fluid will also flow from the chamber C1 to the chamber C2 through the offset passage 138 (depending on calibration of the compression shims 142) and the bypass and refill zones BZ, RZ. For example, even when the movably member 168 is in the fully open position, if the compression force is sufficiently large, the passages 180, 181, 183 could get choked from the amount of fluid circulating therethrough and the compression force could thus cause the compression shims 142 to deflect and thus allow fluid flow through from the chamber C1 to the chamber C2 through the offset passage 138 (in addition to fluid flow through the passages 180, 181, 183 and the bypass and refill zones BZ, RZ).

Conversely, when the movable member 168 is in the fully open position or a partially open position and that the piston 124 is moving in rebound, a portion of fluid flowing from the chamber C2 to the chamber C1 flows from the chamber C2, through the passages 260, 262, into the inner chamber 187, through the apertures 183, through the side passages 181, and through the main passage 180 to the chamber C1. It is understood that, under some circumstances, when the piston 124 is moving in rebound, portions of fluid will also flow from the chamber C2 to the chamber C1 through the offset passage 140 (depending on calibration of the rebound shims 144) and the bypass and refill zones BZ, RZ.

Figure 9:
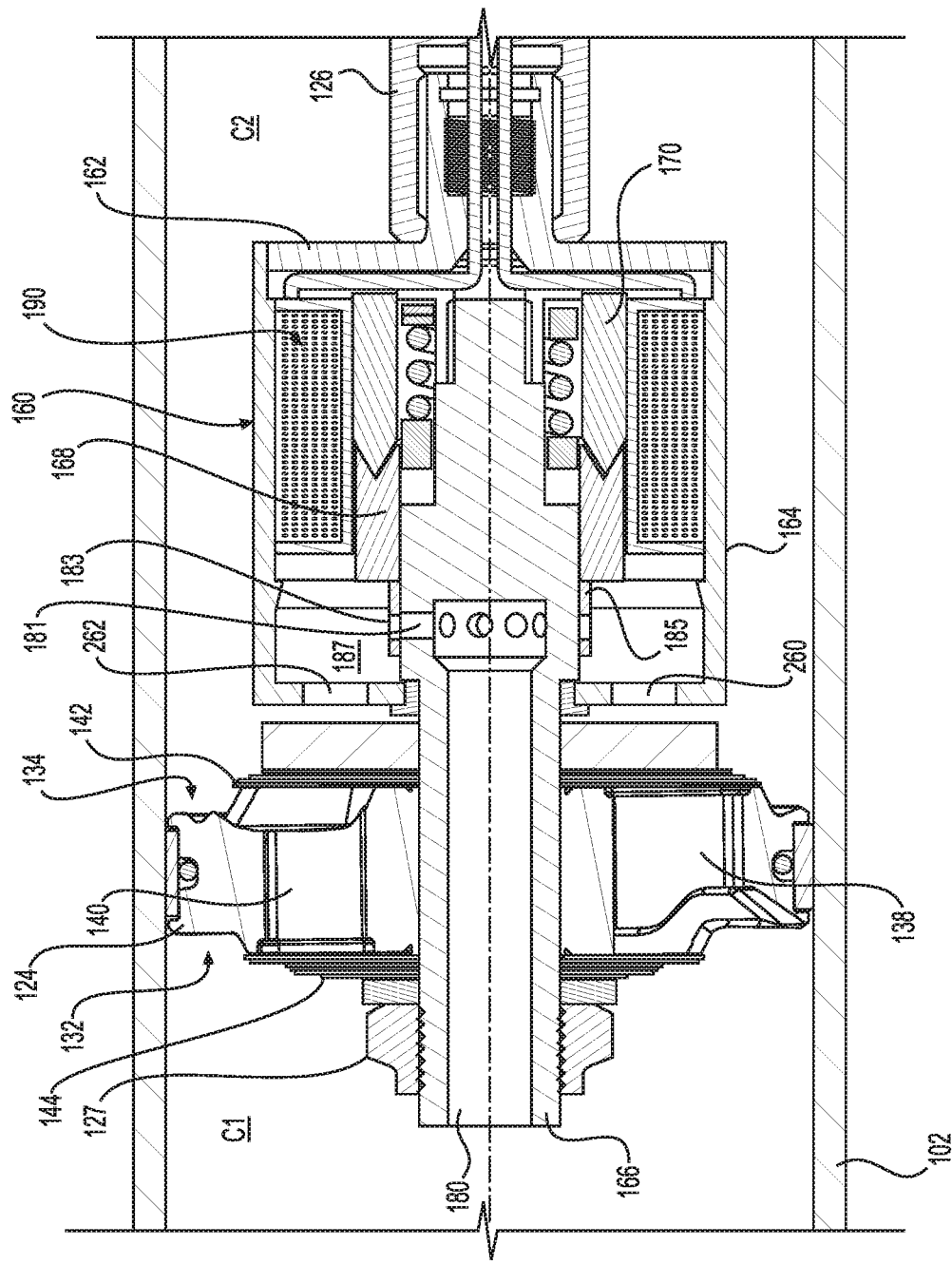
FIG. 9 is a cross-sectional view of part of the shock absorber of FIG. 3, in which the movable member of the electronically controlled valve of the shock absorber is in a fully open position.

In order to actuate the movable member 168, the valve 160 has a solenoid 190 enclosed within the valve housing 164. The solenoid 190 has an annular coil 192 wound around a non-magnetic bobbin 194 and is housed within a case made of magnetic material which is formed by the valve base 162, the valve housing 164, a disc-like spacer 195 and the movable member 168. When the solenoid 190 is energized, the solenoid 190 produces a magnetic field that moves the movable member 168 toward the valve base 162, thus compressing springs 174, 178. The movable member 168 is stopped in its motion toward the valve base 162 by the non-magnetic spacer 196 which prevents direct contact between the angular edge of the cylindrical spring receptacle 170 and a V-grooved end of the movable member 168. In the position of the movable member 168 closest to the valve base 162, which is obtained when the magnetic field generated by the solenoid 190 is sufficiently strong, the movable member 168 is in its fully open position, as shown in FIG. 9. Conversely, when the solenoid 190 is entirely de-energized, the movable member 168 is pushed away from the valve base 162 (towards the piston 124) by the springs 174, 178 to return the movable member 168 to its normal position which is the fully closed position, as shown in FIG. 7. Thus, in this embodiment, the valve 160 is a normally-closed valve. When the solenoid 190 is energized but the magnetic field generated thereby is not sufficiently strong to move the movable member 168 to the fully open position, the movable member 168 is moved to a partially open position (i.e., an intermediate position between the fully closed and fully open positions). Depending on the strength of the magnetic field, the movable member 168 can thus be moved to different partially open positions.

Figure 15:
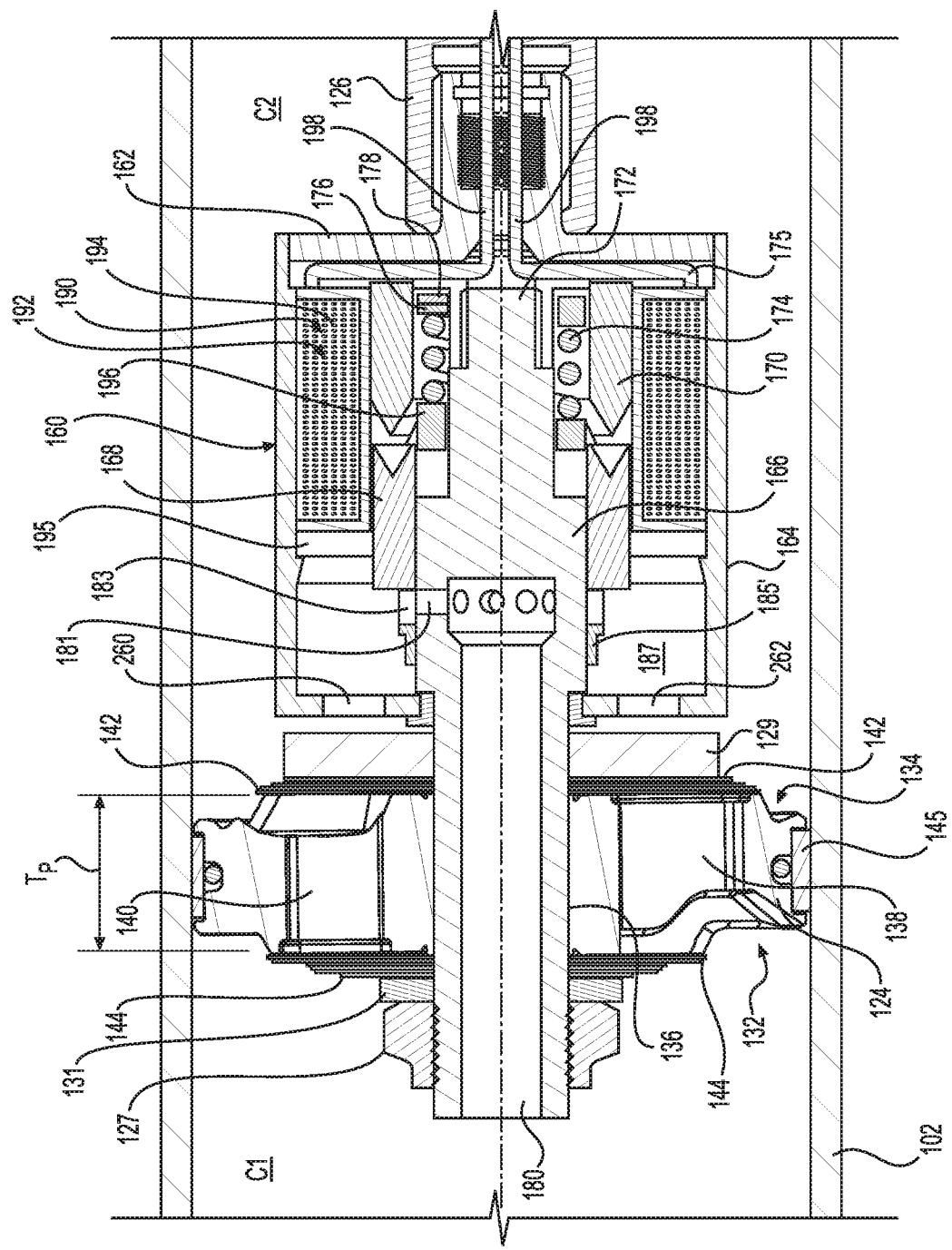
FIG. 15 is a cross-sectional view of part of the shock absorber in accordance with an alternative embodiment in which the electronically controlled valve has a normally-open configuration.
Figure 16:
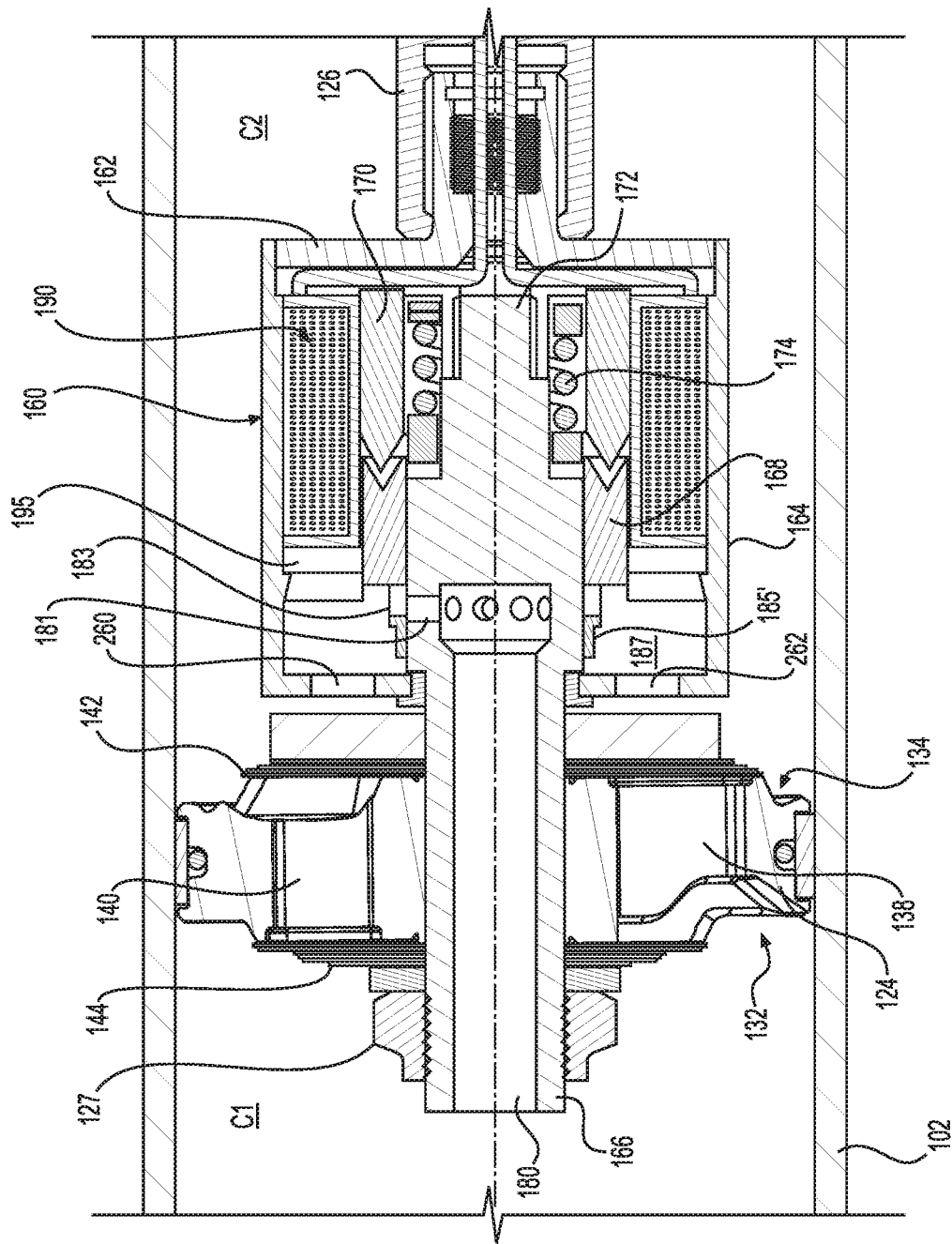
FIG. 16 is a cross-sectional view of part of the shock absorber of FIG. 15, in which the movable member of the electronically controlled valve is in a partially open position.
Figure 17:
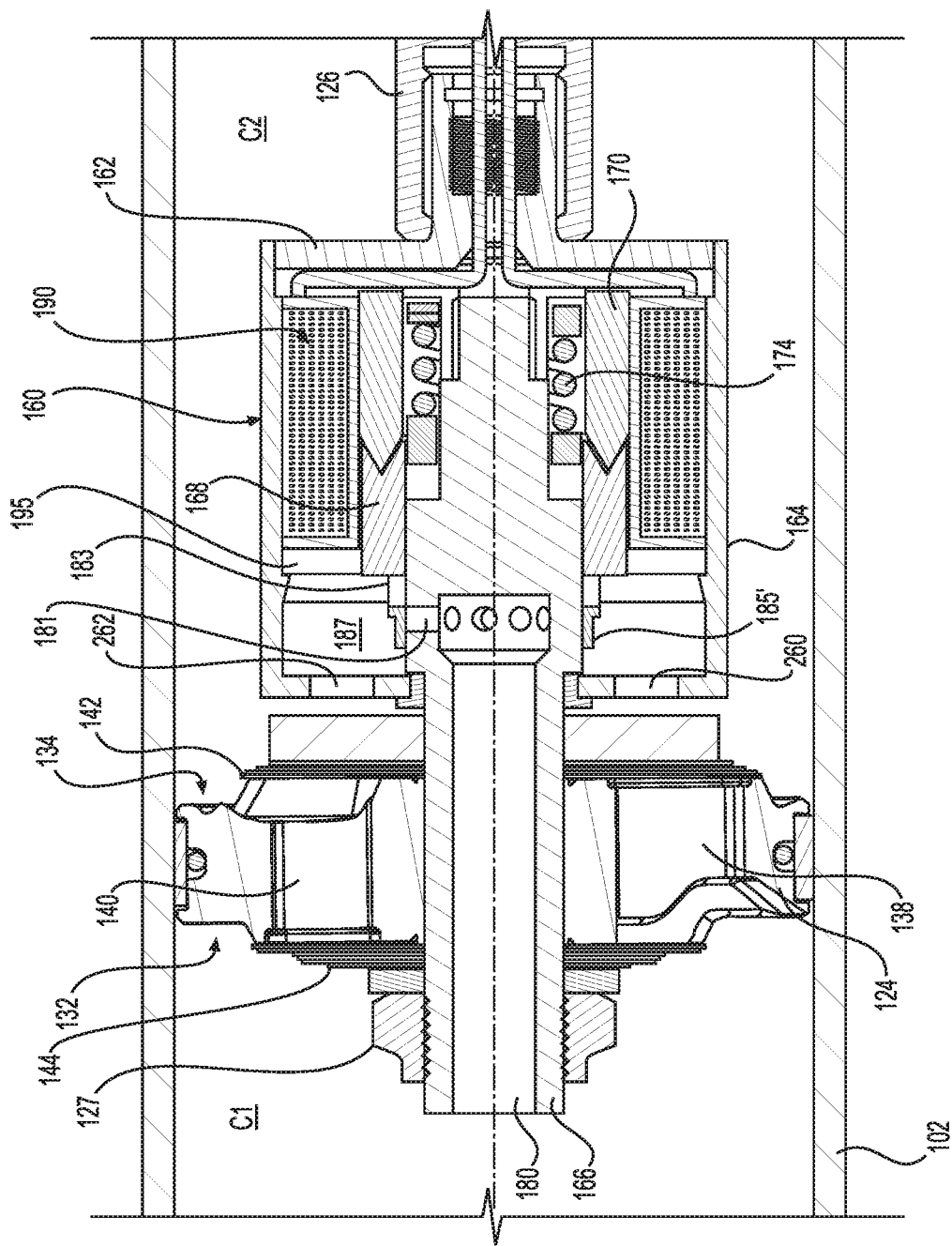
FIG. 17 is a cross-sectional view of part of the shock absorber of FIG. 15, in which the movable member of the electronically controlled valve is in a fully closed position.

In other embodiments, the valve 160 could be normally-open. In such embodiments, as illustrated in FIGS. 15 to 17, when the solenoid 190 is entirely de-energized, the movable member 168 is in its fully open position such that the apertures 183 are aligned with the side passages 181. With reference to FIG. 15, in this embodiment, the apertures 183 of the movable member 168 are positioned differently, namely further from the piston 124, such that the portion of the movable member 168 which blocks the passages 181 in the fully closed position is an upper portion 185'. Thus, when the movable member 168 is closest to the valve base 162, the movable member 168 is in its fully closed position. Conversely, as shown in FIG. 17, when the movable member 168 is furthest from the valve base 162, the movable member 168 is in its fully open position. FIG. 16 shows a partially open position of the valve 160, whereby the upper portion 185' partially blocks the passages 181.

It is contemplated that the valve 160 could be configured differently in other embodiments. That is, different types of valves can be used instead of the valve 160. For instance, in some embodiments, the valve 160 may be an on/off valve that is capable only of the fully closed and fully open positions.

A control unit 200 (schematically shown in FIG. 10) is connected to the valve 160 to control operation thereof by selectively energizing and de-energizing the solenoid 190. More specifically, wires 198 are connected to the solenoid 190 and extend through the valve base 162 and within the piston rod 126 to a shock absorber control connector 193 (FIG. 11) adjacent the suspension mount 108. A connecting link 197 (FIG. 11) connects the control unit 200 to the shock absorber 100a. As can be seen in FIG. 11, the connecting link 197 has a connector 199 which is plugged to the shock absorber control connector 193 and thus allows communication between the control unit 200 with the solenoid 190 such as to control the position of the movable member 168 and thus selectively restrict fluid flow through the central passage 136.

Therefore, as will be understood, the valve 160 is controlled by the control unit 200 to selectively calibrate the damping provided by the shock absorber 100a. Thus, in contrast with the compression and rebound shims 142, 144, the damping calibration effected by the valve 160 can be adjusted without disassembling the shock absorber 100a.

As shown in FIG. 11, the connectors 193, 199 comprise respective orientation features 205, 207 for guiding proper orientation of the connector 199 relative to the shock absorber control connector 193. In this embodiment, the orientation feature 205 of the connector 199 is a protrusion extending from a flange 203 of the connector 199 toward the shock absorber control connector 193 when the connector 199 engages the shock absorber control connector 193, and the orientation feature 207 of the shock absorber control connector 193 is a recess configured to receive the protrusion 205 therein. This facilitates connecting the connectors 193, 199 with one another as it is more readily apparent if the connector 199 is not in the proper orientation to engage the shock absorber control connector 193. It is contemplated that, in alternative embodiments, the orientation feature 205 could be a recess while the orientation feature 207 could be a protrusion. Fastener-receiving holes 209 are provided at the shock absorber control connector 193 to receive fasteners that engage corresponding holes 211 in the connector 199.

Figure 10:
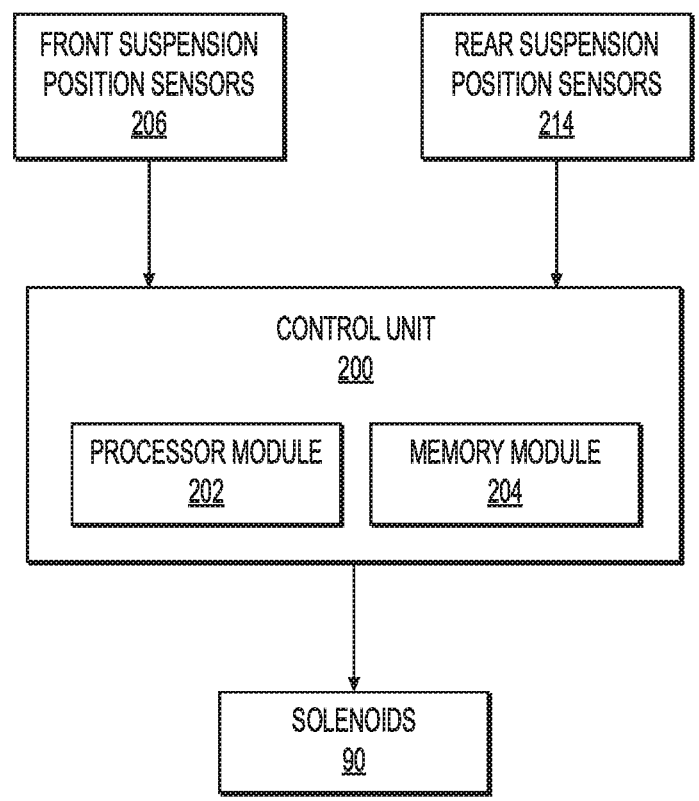
FIG. 10 is a schematic representation of various sensors and other components of the vehicle of FIG. 1.

As shown in FIG. 10, the control unit 200 has a processor module 202 for carrying out executable code, and a non-transitory memory module 204 that stores the executable code in a non-transitory medium (not shown) included in the memory module 204. The processor module 202 includes one or more processors for performing processing operations that implement functionality of the control unit 200. The processor module 202 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 204 may be a semiconductor memory (e.g., read-only memory (ROM) and/or random-access memory (RAM)), a magnetic storage medium, an optical storage medium, and/or any other suitable type of memory. While the control unit 200 is represented as being one entity in this implementation, it is understood that the control unit 200 could comprise separate entities for controlling components separately.

As schematically illustrated in FIG. 10, the control unit 200 is in communication with front suspension position sensors 206 and rear suspension positions 208 in order to control operation of the valves 160 of the front and rear shock absorbers 100a, 100b. As will be explained in greater detail below, the front and rear suspension position sensors 206, 214 are connected to the control unit 200 and send to the control unit 200 signals that are indicative of the position of the piston 124 of the corresponding shock absorber 100a, 100b.

As shown in FIG. 12, each of the front suspension position sensors 206 is mounted to a sensor mounting bracket 215 and is interconnected between the frame 42 of the vehicle 40 and a component of the corresponding front suspension assembly 46. The sensor mounting bracket 215 is also adapted to protect the corresponding front suspension position sensor 206 from physical damage. In this embodiment, a connection portion 208 of the sensor mounting bracket 215 is connected to the frame 42 while the front suspension position sensor 206 is connected, via a link assembly 210, to the upper A-arm 24 of the front suspension assembly 46. As such, the front suspension position sensor 206 senses a front suspension position parameter representative of a position of the upper A-arm 24 relative to the frame 42. A wire 212 connects the front suspension position sensor 206 to the control unit 200.

Figure 14:
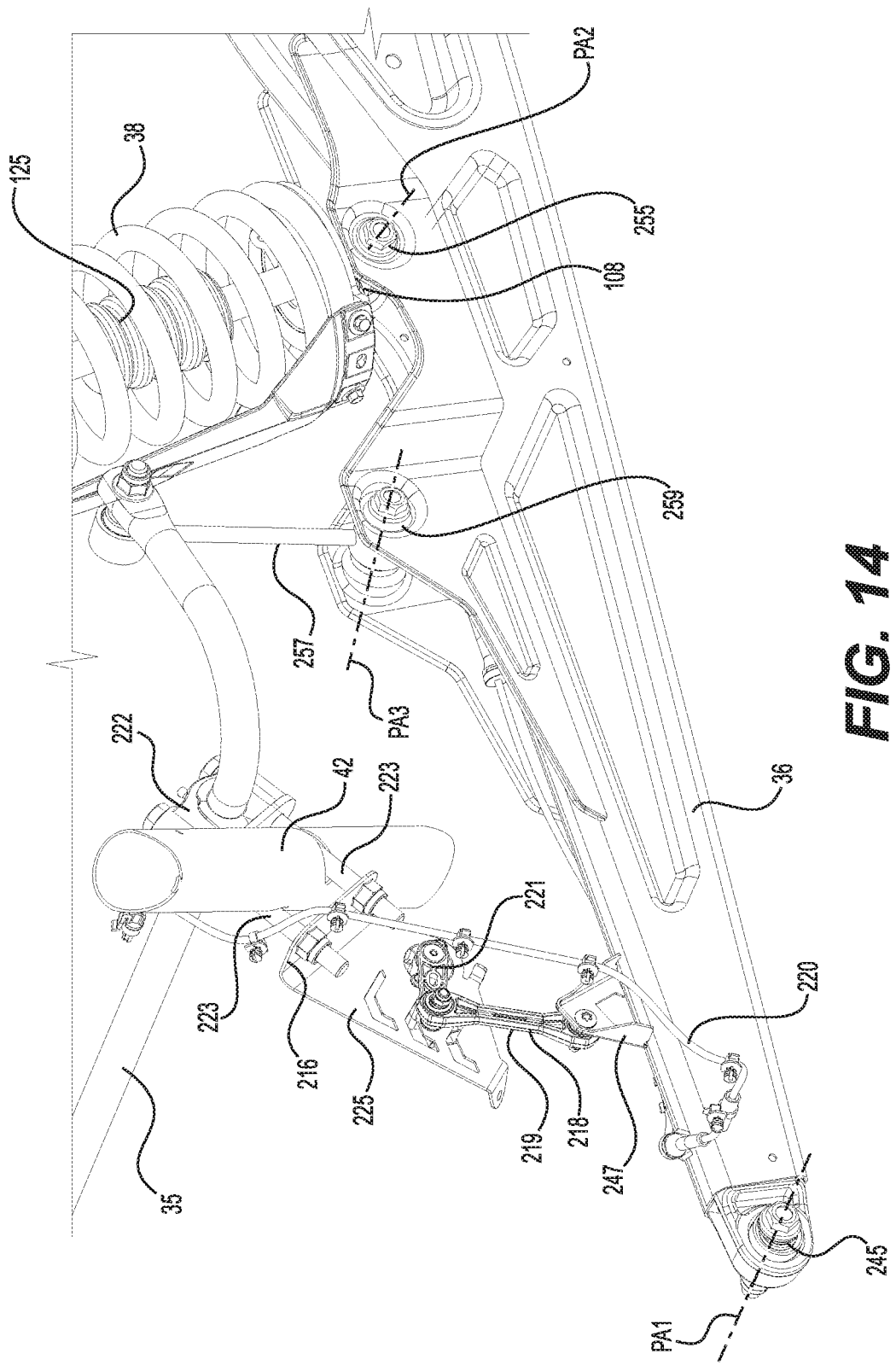
FIG. 14 is a detailed view of part of one of the rear suspension assemblies of FIG. 13.

More specifically, the link assembly 210, which includes two link members pivotably connected to one another (not shown—see similar link assembly 218 for rear suspension positions sensors 214 in FIG. 14), is connected via a bracket 216 to a forwardmost connecting member 234 of two connecting members 234, 236 of the upper A-arm 24. The bracket 216 is disposed on an upper side of the upper A-arm 24 such that the front suspension position sensor 206 is positioned vertically higher than the upper A-arm 24. The front suspension position sensor 206 is thus vertically higher than a pivot axis 229 of a pivot 230 established between the suspension mount 108 of the shock absorber 100a and the upper A-arm 24 when the vehicle 40 is unloaded (i.e., no cargo or occupants) and at rest. This higher vertical position of the front suspension position sensor 206 may help prevent damage to the front suspension position sensor 206 as the front suspension position sensor 206 is less susceptible to getting hit by debris projected from below when driving the vehicle 40. In addition, the front suspension position sensor 206 is disposed longitudinally between the connecting members 234, 236 of the upper A-arm 24. Furthermore, the front suspension position sensor 206 is disposed laterally between a mount 232 at the end of connecting member 234 and the pivot 230. In addition, the front suspension position sensor 206 is disposed forward of the associated shock absorber 100a.

As shown in FIG. 13, each of the rear suspension position sensors 214 is mounted to a sensor mounting bracket 225 and is interconnected between the frame 42 and a component of the corresponding rear suspension assembly 50. The sensor mounting bracket 225 is also adapted to protect the corresponding rear suspension position sensor 214 from physical damage. More particularly, in this embodiment, a connection portion 216 of the sensor mounting bracket 225 is connected to the frame 42 via fasteners 223, while the rear suspension position sensor 214 is connected, via a link assembly 218, to the swing arm 36 of the rear suspension assembly 50. In this embodiment, the fasteners 223 are also used to fasten the pillow block 222 to the frame 42. As such, the rear suspension position sensor 214 senses a rear suspension position parameter representative of a position of the swing arm 36 relative to the frame 42. A wire 220 connects the rear suspension position sensor 214 to the control unit 200.

More specifically, with reference to FIG. 14, the link assembly 218, is connected to the swing arm 36 via a swing arm bracket 247 disposed on an upper side of the swing arm 36. More specifically, the link assembly 218 includes a link member 219 pivotally connected to the swing arm bracket 247 and a link member 221 that is pivotally connected to the upper end of the link member 219 at one end and to the rear suspension position sensor 214 at the other end. As such, the rear suspension position sensor 214 is disposed vertically higher than a pivot axis PA1 of a pivot 245 (FIG. 2) about which the swing arm 36 pivots relative to the frame 42, and rearward of the pivot axis PA1. This higher vertical position of the rear suspension position sensor 214 may help prevent damage to the rear suspension position sensor 214 as the rear suspension position sensor 214 is less susceptible to getting hit by debris projected from below when driving the vehicle 40. In addition, the rear suspension position sensor 214 is disposed forwardly of a pivot axis PA2 of a pivot 255 established between the suspension mount 108 of the shock absorber 100b and the swing arm 36. Thus, the rear suspension position sensor 214 is disposed longitudinally between the pivot axes PA1, PA2. Furthermore, the rear suspension position sensor 214 is disposed forwardly of a pivot axis PA3 of a pivot 259 about which the torsion bar 35 is connected to the swing arm 36 via a link 257. Thus, the rear suspension position sensor 214 is also disposed longitudinally between the pivot axes PA1, PA3. The pivot axis PA3 is disposed forwardly of the pivot axis PA2. Each of the pivot axes PA1, PA2, PA3 extends generally laterally. The rear suspension position sensor 214 is also disposed forward of the associated shock absorber 100b and rearward of the seat cushions of the driver and passenger seats 54, 56 (i.e., the substantially horizontal portions of the seats 54, 56).

It is contemplated that, in other embodiments, a single front suspension position sensor 206 and/or a single rear suspension position sensor 214 could be provided. Moreover, in other embodiments, the rear suspension position sensors 214 could be mounted to the torsion bar 35.

Turning back now to the shock absorber 100a, in this embodiment, the position of the movable member 168 is controlled by the valve 160 based in part on a position of the piston 124 indicated by the front suspension position parameters sensed by the left and right front suspension position sensors 206. More specifically, the front suspension position sensors 206 are connected to the control unit 200 and send to the control unit 200 the front suspension position parameters which are indicative of the position of the piston 124. That is, the position of the piston 124 can be determined based on the front suspension position parameters transmitted by the front suspension position sensors 206 with accuracy. In this embodiment, the left and right front suspension position parameters sensed by the left and right front suspension position sensors 206 are expected to be approximately the same and thus the position of the movable members 168 of the valves 160 of the left and right front shock absorbers 100a will be controlled by the valves 160 similarly. However, if there is a difference between the left and right front suspension position parameters greater than a predetermined allowable difference, the one of the left and right front suspension position parameters that is indicative that the position of the corresponding piston 124 is closest to a bottoming out or top-out position (i.e., closest to either of the end caps 110, 112) will be considered indicative of the position of the piston 124. The movable members 168 of the valves 160 of the rear shock absorbers 100b are controlled similarly based on the position of the associated piston 124 indicated by the rear suspension position parameters sensed by the left and right rear suspension position sensors 214.

The control unit 200 determines, based on the signals sent thereto by the front suspension position sensors 206, the position of the piston 124 relative to the bypass zone BZ and uses this information to control the valve 160. As will be discussed in detail below, the position of the movable member 168 is controlled by the valve 160 based in part on the position of the piston 124 relative to the bypass zone BZ. That is, in this embodiment, the valve 160 moves the movable member 168 to different positions depending on the position of the piston 124 relative to the bypass zone BZ.

For instance, the valve 160 moves the movable member 168 to different positions when: (i) the piston 124 is between the end 128 of the inner tube 102 and the bypass zone BZ; (ii) the piston 124 is aligned with the bypass zone BZ (i.e., the piston 124 is between the bypass aperture 121 closest to the end 128 and the bypass aperture 121 closest to the end 130); and (iii) the piston 124 is between the end 130 of the inner tube 102 and the bypass zone BZ.

Furthermore, in this embodiment, the valve 160 controls fluid flow through the central passage 136 based also on the travel speed of the piston 124 within the inner tube 102. That is, the position of the movable member 168 depends in part on the travel speed of the piston 124, whether moving in compression or rebound. The travel speed of the piston 124 is determined by the control unit 200 based on the signal indicative of the position of the piston 124 received from the front suspension position sensor 206. The control unit 200 uses this information to control the valve 160.

In particular, in this embodiment, the control unit 200 compares the travel speed of the piston 124 to a low predetermined speed PS1 and a high predetermined speed PS2 (greater than the low predetermined speed PS1) in order to actuate the movable member 168. The low and high predetermined speeds to which the travel speed of the piston 124 is compared depends on the direction of travel of the piston 124. Thus, in this embodiment, the valve 160 controls fluid flow through the central passage 136 based also on the direction of travel of the piston 124 such that the position of the movable member 168 is controlled based on if the piston 124 is moving in compression or rebound (the direction of travel of the piston 124 is also indicated by the front suspension position parameter sensed by the front suspension position sensor 206). More specifically, in this embodiment, the low predetermined speed PS1 in rebound is between 0 and 0.8 m/s inclusively and the high predetermined speed PS2 in rebound is between 0.8 m/s and 1.2 m/s inclusively. Furthermore, in this embodiment, the low predetermined speed PS1 in compression is between 0 and 2 m/s inclusively and the high predetermined speed PS2 in compression is between 2 and 4 m/s inclusively. The low and high predetermined speeds PS1, PS2 could have any other suitable values in other embodiments.

In this embodiment, when the piston 124 is moving in rebound between the end 128 of the inner tube 102 and the bypass zone BZ and the travel speed of the piston 124 is below the low predetermined speed PS1, the valve 160 moves the movable member 168 to be in the fully open position. This softens the damping calibration of the shock absorber 100a. Conversely, when the piston 124 is moving in rebound between the end 128 of the inner tube 102 and the bypass zone BZ and the travel speed of the piston 124 is above the high predetermined speed PS2, the valve 160 moves the movable member 168 to be in a partially open position. While this softens the damping calibration of the shock absorber 100a, the softening of the damping calibration is limited (relative to the fully open position) so as to prevent kicking of the suspension 46 whereby the piston 124 very suddenly moves toward the end 130 of the inner tube 102, causing a sudden upward motion of the suspension 46.

When the piston 124 is moving in rebound and aligned with the bypass zone BZ and the travel speed of the piston 124 is below the low predetermined speed PS1, the valve 160 moves the movable member 168 to be near the fully open position. Similarly, when the piston 124 is moving in rebound and aligned with the bypass zone BZ and the travel speed of the piston 124 is above the high predetermined speed PS2, the valve 160 moves the movable member 168 to be near the fully open position.

When the piston 124 is moving in rebound between the bypass zone BZ and the refill zone RZ and the travel speed of the piston 124 is below the low predetermined speed PS1, the valve 160 moves the movable member 168 to be near the fully open position. Conversely, when the piston 124 is moving in rebound between the bypass zone BZ and the refill zone RZ and the travel speed of the piston 124 is above the high predetermined speed PS2, the valve 160 moves the movable member 168 toward the fully closed position such as to begin to close the valve 160.

When the piston 124 is moving in rebound near the end 130 of the inner tube 102 (i.e., between the refill zone RZ and the end 130) and the travel speed of the piston 124 is below the low predetermined speed PS1, the valve 160 moves the movable member 168 to be closer to the fully open position than the fully closed position (as shown in FIG. 9 for example). More specifically, in this embodiment, in such a scenario the movable member 168 is moved to the fully open position such as to permit maximum fluid flow through the central passage 136. Notably, when the piston 124 is close to full extension (i.e., a distance between the frame and suspension mounts 106, 108 is close to its maximum) and travelling at a low speed, a stiff damping is not needed and thus a softer damping is provided by permitting substantial fluid flow through the central passage 136. However, as the piston 124 moves closer to the end 130 (e.g., less than halfway between the refill zone RZ and the end 130), the valve 160 moves the movable member 168 to be in the fully closed position such as to prevent top-out of the shock absorber 100a (i.e., the valve housing 164 contacting the end cap 112). Conversely, when the piston 124 is moving in rebound near the end 130 of the inner tube 102 and the travel speed of the piston 124 is above the high predetermined speed PS2, the valve 160 moves the movable member 168 to be closer to the fully closed position than the fully open position or to be at the fully closed position. This stiffens the damping calibration of the shock absorber 100a to prevent the valve housing 164 from coming into contact with the end cap 112 and/or to prevent metal to metal contact between suspension components.

When the piston 124 is moving in compression near the end 130 of the inner tube 102 (i.e., between the refill zone RZ and the end 130) and the travel speed of the piston 124 is below the low predetermined speed PS1, the valve 160 moves the movable member 168 to be closer to the fully open position than the fully closed position. Similarly, when the piston 124 is moving in compression near the end 130 of the inner tube 102 and the travel speed of the piston 124 is above the high predetermined speed PS2, the valve 160 moves the movable member 168 to be closer to fully open position than the fully closed position. In some embodiments, when the piston 124 is moving in compression near the end 130 of the inner tube 102 and the travel speed of the piston 124 is above the high predetermined speed PS2, the valve 160 moves the movable member 168 toward the fully closed position such as to begin to close the valve 160.

When the piston 124 is moving in compression between the bypass zone BZ and the refill zone RZ and the travel speed of the piston 124 is below the low predetermined speed PS1, the valve 160 moves the movable member 168 to be closer to the fully open position than the fully closed position. Similarly, when the piston 124 is moving in compression between the bypass zone BZ and the refill zone RZ and the travel speed of the piston 124 is above the high predetermined speed PS2, the valve 160 moves the movable member 168 to be closer to the fully open position than the fully closed position. In some embodiments, when the piston 124 is moving in compression between the bypass zone BZ and the refill zone RZ and the travel speed of the piston 124 is above the high predetermined speed PS2, the valve 160 moves the movable member 168 toward the fully closed position such as to begin to close the valve 160.

Figure 5:
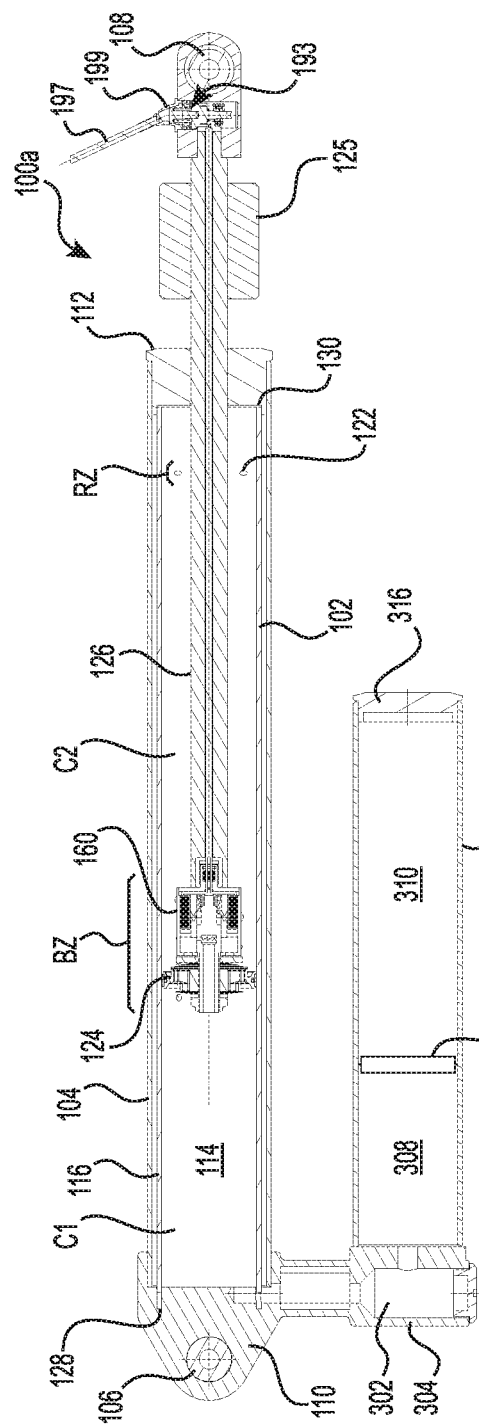
FIG. 5 is a cross-sectional view of the shock absorber of FIG. 3 in which a piston of the shock absorber is aligned with a bypass zone of the shock absorber.

As another example, when the piston 124 moving in compression and is aligned with the bypass zone BZ (as shown in FIG. 5) and the travel speed of the piston 124 is above the high predetermined speed PS2, the valve 160 moves the movable member 168 to be closer to the fully closed position than the fully open position or to be at the fully closed position. More specifically, in this embodiment, in such a scenario the movable member 168 is moved to the fully closed position as shown in FIG. 7. Notably, when the piston 124 is aligned with the bypass zone BZ and travelling at a high speed in compression, a stiff damping calibration is preferred to prevent the shock absorber 100a from fully collapsing (i.e., bottoming out) which could potentially cause damage to the shock absorber 100a or to some suspension components. Conversely, when the piston 124 is moving in compression and is aligned with the bypass zone BZ and the travel speed of the piston 124 is below the low predetermined speed PS1, the valve 160 moves the movable member 168 to be closer to the fully open position than the fully closed position or to be at the fully open position such as to soften the damping calibration of the shock absorber 100a.

As yet another example, when the piston 124 is moving in compression from an end of the bypass zone BZ closest to the end 128 and the travel speed of the piston 124 is above the high predetermined speed PS2, the valve 160 moves the movable member 168 to a position other than the fully closed position (i.e., in a partially open position in which there is at least some fluid flow through the central passage 136 or in the fully open position). Notably, when the piston 124 is between the end 128 and the bypass zone BZ and travelling at a high speed in compression, a gradual reduction in the travelling speed of the piston 124 can be achieved by permitting some fluid flow through the central passage 136 via the valve 160. This may prevent a sudden reduction in the travelling speed of the piston 124 which would cause a shock that would be transferred to the occupants of the vehicle 40. Shortly thereafter, as the piston 124 continues moving toward the end 128, the valve 160 moves the movable member 128 to the fully closed position to prevent the shock absorber 100a from bottoming out, potentially causing damage thereto and transferring the resulting shock to the occupants of the vehicle 40.

Figure 6:
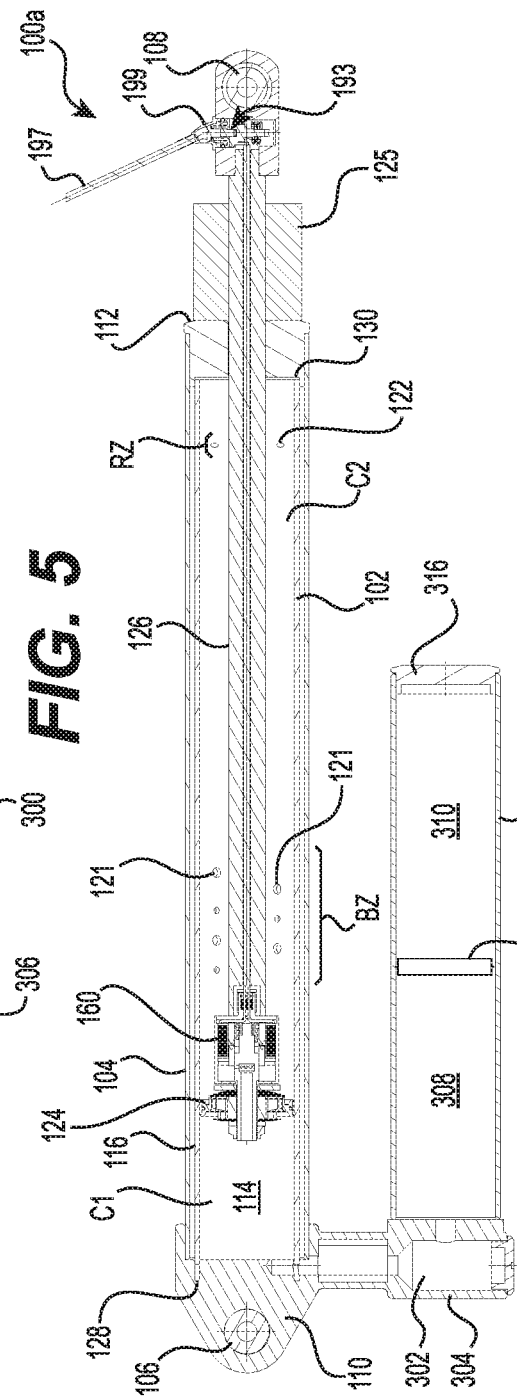
FIG. 6 is a cross-sectional view of the shock absorber of FIG. 3 in which the piston of the shock absorber is in a position offset from the bypass zone.

When the piston 124 is moving in compression between the end 128 and the bypass zone BZ (as shown in FIG. 6) and the travel speed of the piston 124 is above the high predetermined speed PS2, the valve 160 moves the movable member 168 to be in the fully closed position to prevent the shock absorber 100a from bottoming out, potentially causing damage thereto and transferring the resulting shock to the occupants of the vehicle 40. When the piston 124 is moving in compression between the end 128 and the bypass zone BZ and the travel speed of the piston 124 is below the low predetermined speed PS1, the valve 160 moves the movable member 168 to be closer to the fully closed position than the fully open position or to be at the fully closed position.

The position of the movable member 168 may be controlled differently in other embodiments. For instance, in another embodiment, the valve 160 moves the movable member 168 to a different position only when: (i) the piston 124 is between the end 128 of the inner tube 102 and the bypass zone BZ; (ii) the piston 124 is aligned with the bypass zone BZ (i.e., the piston 124 is between the bypass aperture 121 closest to the end 128 and the bypass aperture 121 closest to the end 130); and (iii) the piston 124 is between the end 130 of the inner tube 102 and the bypass zone BZ. For example, in this alternative embodiment, the movable member 168 is moved to a common position when the piston 124 is between either of the ends 128, 130 and the bypass zone BZ such that fluid flow through the central passage 136 is substantially the same, while the movable member 168 is moved to a different position (e.g., a more open position such as the fully open position) when the piston 124 is aligned with the bypass zone BZ such as to increase fluid flow through the central passage 136.

As will be understood from the above description, the combination of the valve 160 with the bypass and refill apertures 121, 122 allows a greater damping calibration range than either option would permit on its own. Notably, the size of the apertures 121, 122 limits the softening of the damping calibration provided by the bypass and refill zones BZ, RZ (when the piston 124 is between the bypass and refill zones BZ, RZ). Moreover, the bypass and refill apertures 121, 122 do not affect the damping calibration when the piston 124 is past the bypass and refill zones BZ, RZ (i.e., between the end 128 and the bypass zone BZ, and between the end 130 and the refill zone RZ). For its part, the valve 160 on its own (without the bypass and refill apertures 121, 122) is also limited in its damping calibration range by the size of its passages 180, 181, 183.

However, when the bypass and refill apertures 121, 122 and the valve 160 are used simultaneously as described above, the valve 160 can be controlled to further soften the damping calibration for the range of motion of the piston 124 between the bypass and refill zones BZ, RZ by permitting fluid flow through the central passage 136. In addition, the valve 160 can be controlled to soften the damping calibration when the piston 124 is between the end 128 and the bypass zone BZ, and between the end 130 and the refill zone RZ (where the bypass and refill zones apertures 121, 122 have no effect on the damping calibration).

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A shock absorber for a vehicle, comprising:
   an inner tube having a first end and a second end, the inner tube at least partially defining an inner fluid compartment;

an outer tube enclosing at least in part the inner tube therein, the inner tube and the outer tube together at least partially defining an outer fluid compartment therebetween, the inner tube defining a bypass zone, the bypass zone comprising a plurality of bypass apertures defined in the inner tube, the plurality of bypass apertures fluidly communicating the inner fluid compartment with the outer fluid compartment;

a piston movably mounted within the inner tube, the piston moving in compression when the piston moves towards the first end of the inner tube and in rebound when the piston moves towards the second end of the inner tube, the piston having a first side facing the first end of the inner tube and a second side facing the second end of the inner tube, the piston defining a piston passage extending through the piston for permitting fluid flow between the first side and the second side;

a piston rod connected to the piston, the piston rod extending through the second end of the inner tube; and an electronically controlled valve connected to the piston, the electronically controlled valve controlling fluid flow through the piston passage, the electronically controlled valve comprising a movable member that is movable between a plurality of positions, the plurality of positions including:
 a fully closed position in which the movable member inhibits fluid flow through the piston passage; and
 a fully open position in which the movable member permits maximal fluid flow through the piston passage, the vehicle comprising a suspension position sensor adapted for sensing a suspension position parameter indicative of a position of the piston, the electronically controlled valve controlling a position of the movable member based at least in part on the position of the piston indicated by the suspension position parameter sensed by the suspension position sensor, the electronically controlled valve controlling the position of the movable member based at least in part on the position of the piston relative to the bypass zone.

2. The shock absorber of claim 1, wherein:
the electronically controlled valve moves the movable member to a first position when the piston is between the first end and the bypass zone;
the electronically controlled valve moves the movable member to a second position different from the first position when the piston is aligned with the bypass zone; and
the electronically controlled valve moves the movable member to a third position different from the first and second positions when the piston is between the second end and the bypass zone.

3. The shock absorber of claim 1, wherein:
the electronically controlled valve moves the movable member to a first position when the piston is between the first end and the bypass zone;
the electronically controlled valve moves the movable member to a second position different from the first position when either (i) the piston is aligned with the bypass zone, or (ii) the piston is between the second end and the bypass zone.

4. The shock absorber of claim 1, wherein:
the piston passage is a central piston passage;
the piston further defines two offset piston passages, the offset piston passages being radially spaced from the central piston passage,
the shock absorber further comprises a plurality of shims affixed to the piston for restricting fluid flow through the two offset piston passages, the plurality of shims including:
 at least one compression shim on the first side of the piston for restricting flow through a first offset piston passage of the two offset piston passages when the piston moves in compression; and
 at least one rebound shim on the second side of the piston for restricting flow through a second offset piston passage of the two offset piston passages when the piston moves in rebound.

5. The shock absorber of claim 1, further comprising:
a piggy-back fluid chamber fluidly connected to the inner fluid compartment, the piggy-back fluid chamber having a first end and a second end;
a divider movably mounted within the piggy-back fluid chamber, the divider having a first side facing the first end of the piggy-back fluid chamber and a second side facing the second end of the piggy-back fluid chamber, the divider being biased toward the first end of the piggy-back fluid chamber;
a channel extending from the piggy-back fluid chamber to the inner tube to fluidly connect the piggy-back fluid chamber with the inner fluid compartment, the channel opening into the piggy-back fluid chamber between the divider and the first end of the piggy-back fluid chamber, the channel opening into the inner fluid compartment near the first end of the inner tube.

6. The shock absorber of claim 1, wherein a center-to-center distance between adjacent ones of the bypass apertures measured in a direction parallel to the piston rod is greater than a thickness of the piston measured from the first side to the second side of the piston.

7. The shock absorber of claim 1, wherein the inner tube defines a refill zone, the refill zone comprising a plurality of refill apertures defined in the inner tube, the plurality refill apertures fluidly communicating the inner fluid compartment with the outer fluid compartment, the refill zone being closer to the second end of the inner tube than the bypass zone.

8. A vehicle comprising:
a frame;
at least one wheel; and
the shock absorber of claim 1, the shock absorber being connected between the frame and the at least one wheel.

9. The vehicle of claim 8, further comprising:
a control unit communicatively connected to the electronically controlled valve and the suspension position sensor; and
wherein:
 the control unit comprises a processor and a computer readable memory; and
 the electronically controlled valve is configured to receive a control signal from the control unit.

10. A suspension system for a vehicle, the suspension system comprising:
a first shock absorber comprising the shock absorber of claim 1;
a second shock absorber comprising the shock absorber of claim 1; and a control unit communicatively connected to the electronically controlled valve and the suspension position sensor of each of the first shock absorber and the second shock absorber, the control unit being configured to control the first shock absorber and the second shock absorber independently based on respective sensor signals.

11. A method for controlling a shock absorber, the shock absorber comprising:

an inner tube having a first end and a second end, the inner tube defining an inner fluid compartment;

an outer tube enclosing at least in part the inner tube therein, the inner tube and the outer tube together partially defining an outer fluid compartment therebetween, the inner tube defining a bypass zone, the bypass zone comprising a plurality of bypass apertures defined in the inner tube, the plurality of bypass apertures fluidly communicating the inner fluid compartment with the outer fluid compartment;

the method comprising:

determining a position of a piston of the shock absorber relative to the bypass zone; and controlling an electronically controlled valve to selectively restrict a piston passage extending through the piston based at least in part on a position of the piston relative to the bypass zone.

12. The method of claim 11, wherein:

controlling the electronically controlled valve to selectively restrict the piston passage comprises:

moving a movable member of the electronically controlled valve to a first position when the piston is between the first end and the bypass zone;

moving the movable member of the electronically controlled valve to a second position when the piston is aligned with the bypass zone;

moving the movable member to a third position when the piston is between the second end and the bypass zone.

13. The method of claim 12, further comprising:

determining a travel speed of the piston; and controlling the electronically controlled valve to selectively restrict the piston passage comprises controlling the electronically controlled valve to selectively restrict the piston passage based at least in part on the travel speed of the piston.

14. The method of claim 13, wherein:

the movable member is movable between a plurality of positions including:

a fully closed position in which the movable member inhibits fluid flow through the piston passage; and a fully open position in which the movable member permits maximal fluid flow through the piston passage;

controlling the electronically controlled valve to selectively restrict the piston passage based at least in part on the travel speed of the piston comprises:

moving the movable member such that the movable member is closer to the fully open position than the fully closed position when the piston is moving in rebound near the second end and the travel speed of the piston is below a first predetermined speed.

15. The method of claim 14, wherein:

controlling the electronically controlled valve to selectively restrict the piston passage based at least in part on the travel speed of the piston comprises:

moving the movable member such that the movable member is in the fully closed position or is closer to the fully closed position than the fully open position when the piston is moving in compression and is aligned with the bypass zone and the travel speed of the piston is above a second predetermined speed greater than the first predetermined speed.

16. The method of claim 15, wherein:

controlling the electronically controlled valve to selectively restrict the piston passage based at least in part on the travel speed of the piston comprises:

moving the movable member such that the movable member is in the fully closed position when the piston is moving in compression between the first end and the bypass zone and the travel speed of the piston is above the second predetermined speed.

17. A shock absorber for a vehicle, comprising:

an inner tube having a first end and a second end, the inner tube at least partially defining an inner fluid compartment;

an outer tube enclosing at least in part the inner tube therein, the inner tube and the outer tube together at least partially defining an outer fluid compartment therebetween, the inner tube defining a bypass zone, the bypass zone comprising a plurality of bypass apertures defined in the inner tube, the plurality of bypass apertures fluidly communicating the inner fluid compartment with the outer fluid compartment;

a piston movably mounted within the inner tube, the piston moving in compression when the piston moves towards the first end of the inner tube and in rebound when the piston moves towards the second end of the inner tube, the piston having a first side facing the first end of the inner tube and a second side facing the second end of the inner tube, the piston defining a piston passage extending through the piston for permitting fluid flow between the first side and the second side;

a piston rod connected to the piston, the piston rod extending through the second end of the inner tube; and an electronically controlled valve connected to the piston, the electronically controlled valve controlling fluid flow through the piston passage, the electronically controlled valve comprising a movable member that is movable between a plurality of positions, the plurality of positions including:

a fully closed position in which the movable member inhibits fluid flow through the piston passage; and a fully open position in which the movable member permits maximal fluid flow through the piston passage, the vehicle comprising a suspension position sensor adapted for sensing a suspension position parameter indicative of a position of the piston, the electronically controlled valve controlling a position of the movable member based at least in part on the position of the piston indicated by the suspension position parameter sensed by the suspension position sensor, the electronically controlled valve controlling fluid flow through the piston passage based at least in part on a travel speed of the piston, when the piston is moving in rebound near the second end and the travel speed of the piston is below a first predetermined speed, the movable member being closer to the fully open position than the fully closed position.

* * * * *